US011107149B2

(12) United States Patent
Polakala

(10) Patent No.: US 11,107,149 B2
(45) Date of Patent: Aug. 31, 2021

(54) COLLABORATIVE LIST MANAGEMENT

(71) Applicant: Lemon Hat, Fremont, CA (US)

(72) Inventor: Kishore Kumar Polakala, Fremont, CA (US)

(73) Assignee: Lemon Hat, Fremont, CA (US)

(*) Notice: Subject to any disclaimer, the term of this patent is extended or adjusted under 35 U.S.C. 154(b) by 349 days.

(21) Appl. No.: 15/977,870

(22) Filed: May 11, 2018

(65) Prior Publication Data

US 2019/0347710 A1 Nov. 14, 2019

(51) Int. Cl.
*G06Q 30/00* (2012.01)
*G06Q 30/06* (2012.01)
*H04L 12/58* (2006.01)
*G06Q 30/02* (2012.01)

(52) U.S. Cl.
CPC ..... *G06Q 30/0635* (2013.01); *G06Q 30/0224* (2013.01); *G06Q 30/0239* (2013.01); *H04L 51/046* (2013.01)

(58) Field of Classification Search
None
See application file for complete search history.

(56) References Cited

U.S. PATENT DOCUMENTS

| | | | |
|---|---|---|---|
| 7,249,056 B1* | 7/2007 | Crouthamel | G06Q 30/06 705/26.41 |
| 9,996,865 B2* | 6/2018 | Mengerink | G06Q 30/0613 |
| 10,296,962 B2* | 5/2019 | Abraham | G06Q 30/06 |
| 10,878,477 B2* | 12/2020 | Narasimhan | G06Q 30/0243 |
| 2003/0050858 A1* | 3/2003 | Rossi | G06Q 10/0637 705/7.35 |
| 2005/0139661 A1* | 6/2005 | Eglen | G06Q 30/06 235/383 |
| 2010/0030578 A1* | 2/2010 | Siddique | G06Q 40/12 705/3 |
| 2012/0246066 A1* | 9/2012 | Rice | G06Q 30/06 705/39 |
| 2013/0215116 A1* | 8/2013 | Siddique | G06Q 20/204 345/420 |
| 2014/0074585 A1* | 3/2014 | Madsen | G06Q 30/0239 705/14.39 |
| 2016/0210602 A1* | 7/2016 | Siddique | G06Q 10/0637 |
| 2018/0317303 A1* | 11/2018 | Cairns | H04W 4/80 |
| 2019/0340700 A1* | 11/2019 | Haas | G06Q 40/12 |

OTHER PUBLICATIONS

Brown "Cartonomy aims to revolutionise social commerce with shared shopping carts" Retrieved from https://www.zdnet.com/article/cartonomy-aims-to-revolutionise-commerce-with-shared-shopping-carts/ (Year: 2014).*

* cited by examiner

*Primary Examiner* — Naeem U Haq
(74) *Attorney, Agent, or Firm* — FIG. 1 Patents

(57) ABSTRACT

Techniques described herein provide collaborative list management features. Various implementations receive selection of a list item included in a list associated with a list manager that provides the collaborative list management services. In response to receiving selection of the list item, one or more implementations receive input to invoke an action in a context associated with the list item, such as establishing a communication session, acquiring supplemental content, sharing list information, generating vendor-based lists, accessing third-party services, and so forth. Accordingly, various implementations invoke the action in the context of the selected list item.

20 Claims, 28 Drawing Sheets

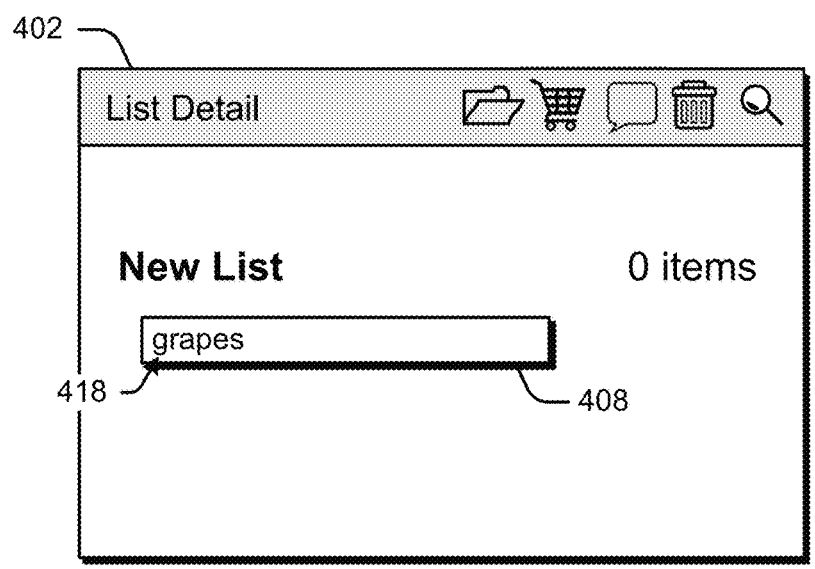
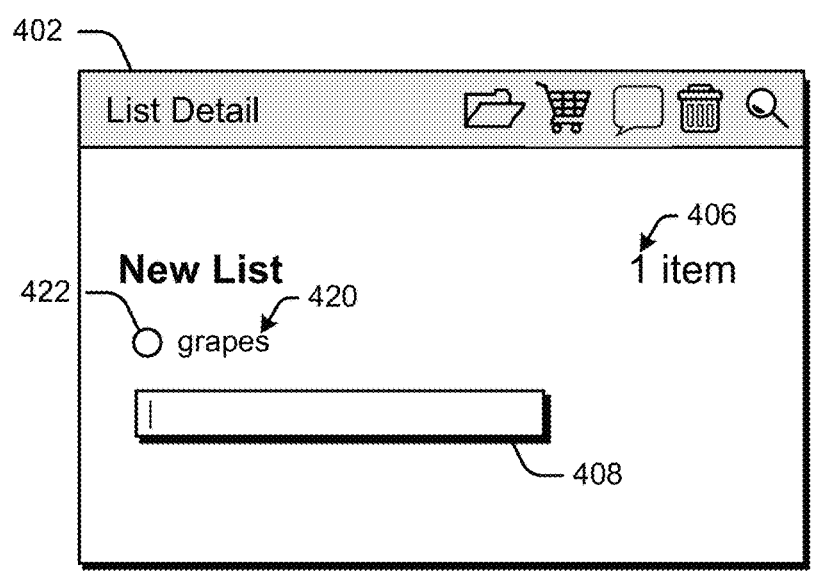
FIG. 4b

COLLABORATIVE LIST MANAGEMENT

BACKGROUND

Lists allow a person to group or record items in a manner relevant to themselves. As one example, a shopping list includes a grouping of items that the person intends to purchase at a store, such as items needing to be replaced, items for a recipe, items for gifting, and so forth. While lists enable a user to group items in a meaningful manner, the user oftentimes performs manual searches separately from the list generation in order to acquire additional information about the list items, such store pricing information, coupon availability, item availability, and so forth. The manual nature of these searches often deters a user from performing them, thus creating missed opportunities and a lack of awareness on the user's behalf.

BRIEF DESCRIPTION OF THE SEVERAL VIEWS OF THE DRAWINGS

While the appended claims set forth the features of the present techniques with particularity, these techniques, together with their objects and advantages, may be best understood from the following detailed description taken in conjunction with the accompanying drawings of which:

FIGS. 4*a* and 4*b* illustrate an example of creating a list in accordance with one or more implementations;

DETAILED DESCRIPTION

Figure 1:
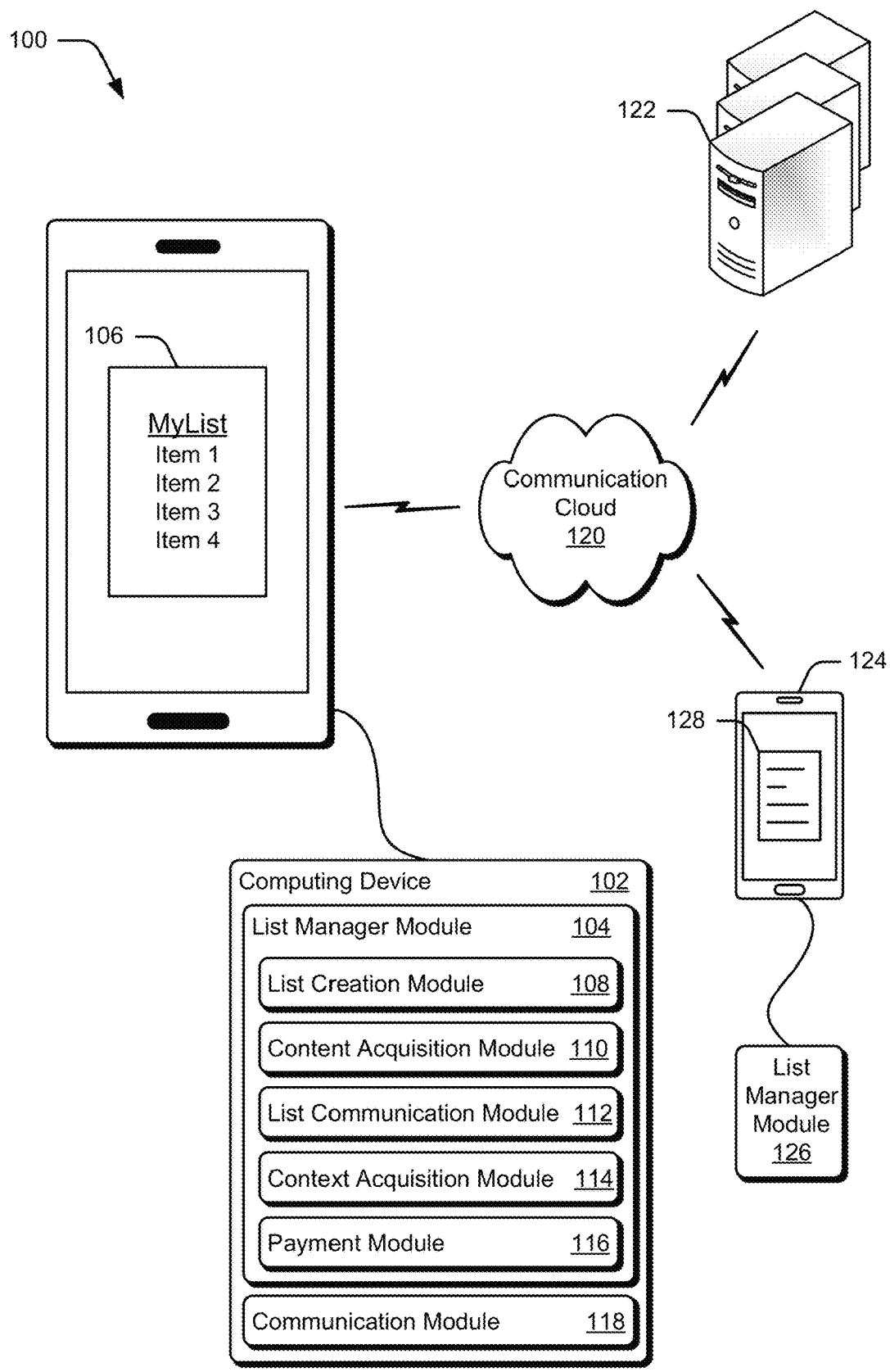
FIG. 1 is an overview of a representative environment of collaborative list management in accordance with one or more implementations.

Turning to the drawings, wherein like reference numerals refer to like elements, techniques of the present disclosure are illustrated as being implemented in a suitable environment. The following description is based on embodiments of the claims and should not be taken as limiting the claims with regard to alternative embodiments that are not explicitly described herein.

Techniques described herein provide collaborative list management features. Various implementations receive selection of a list item included in a list associated with a list manager that provides the collaborative list management services. In response to receiving selection of the list item, one or more implementations receive input to invoke an action in a context associated with the list item, such as establishing a communication session, acquiring supplemental content, sharing list information, generating vendor-based lists, accessing third-party services, and so forth. Accordingly, various implementations invoke the action in the context of the selected list item.

Alternately or additionally, techniques described herein provide an ability to share list information in the context of a list manager shared group. One or more implementations establish a list manager shared group using a list manager that provides one or more collaborative services. Members of the list manager shared group can include a computing device associated with the list manager and a remote computing device. In response to receiving a modification to the list, various implementations propagate the modification to the members of the list manager shared group. The modification can include any type of modification to the list, such as state changes, user comments, list entries, list deletions, and so forth.

Consider now an example environment in which various aspects as described herein can be employed.

Example Environment

FIG. 1 illustrates an example environment 100 that includes an example list manager in accordance with one or more implementations. Environment 100 includes computing device 102 that provides a user with list management capabilities as further described herein. In at least some implementations, computing device 102 represents a smart device, such as an Internet of Things ("IoT") device that corresponds to a network of interconnected devices that inter-operate with one another using the network. Accordingly, computing device 102 can range from a system with significant processing power, to a lightweight device with minimal processing power. To provide list management capabilities, computing device 102 includes list manager module 104.

List manager module 104 represents functionality that administers various list features, such as creating lists, deleting lists, amending list content, assigning a list and/or list items to a person, creating a list manager shared group, synchronizing list content across the list manager shared group, forwarding a list and/or list information to devices external to the list manager, acquiring supplemental list content (e.g., pricing, coupon codes, etc.), remote purchasing of list items, accessing and/or providing third-party services, etc. The phrase "list manager shared group" is used to denote a closed group of users that share list information amongst members of the closed group. The closed group includes members that are intentionally added to the group in order gain access to the list information. This differs from public and/or open access where users can gain access to list information without being a group member. In FIG. 1, list manager module 104 provides various services associated with list 106, such as the creation, editing, and/or synchronization of list 106, establishing communication sessions with other devices in the context of list 106, acquiring pricing and/or coupon information for list items included in list 106, and so forth. To provide these features, various implementations of list manager module 104 include list creation module 108, content acquisition module 110, list communication module 112, context acquisition module 114, and payment module 116. While listed as individual modules, alternate or additional implementations integrate portions or all of the individual modules illustrated in FIG. 1 into any other suitable combination of modules. These modules can exchange data and/or invoke functionality provided by other modules to provide the user with a seamless experience. In other words, these modules can interact an exchange data without a user explicitly invoking each module individually. For example, list creation module 108 can provide user interaction data to context acquisition module 114 and/or receive user preference data from context acquisition module 114. While list manager module 104 is illustrated in FIG. 1 as including these various modules, it is to be appreciated that alternate embodiments include additional modules and/or remove modules based on what features are supported by the list manager module. For instance, various implementations can optionally include payment module 116. To facilitate module inter-operability, various implementations define a data structure according to a set of rules that, when followed, provide a mechanism for cross-entity and/or cross-module data sharing. For example, the set of rules can outline what type of information the data included in the data structure describes, an amount of data stored within the data structure, a format in which the data is stored within the data structure, and so forth. By following these rules, a first entity and/or module can create and store a data structure such that a second entity and/or module can successfully access and interpret the data included in the data structure.

List creation module 108 provides the ability to create, delete, edit, and/or maintain multiple lists. This includes adding list items, deleting list items, customize a list identifier, generating a base list, creating new lists from the base list, and so forth. Alternately or additionally, list creation module 108 provides various types of state information associated with the lists being maintained, such as time-based state information (e.g., list creation date and/or time, editing timestamps, sharing timestamps, etc.), purchased state information, assignment state information, sharing state information, communication session state information, price state information, and so forth. Accordingly, some implementations of list creation module 108 maintain a database of lists and/or list information associated with the list that can be used to store and/or retrieve state information. This can alternately or additionally include acquiring and/or storing supplemental information in the database, examples of which are provided here in. To store the lists and/or list information in the database, various implementations use a data structure that follows a set of rules which, when followed, provide a mechanism for cross-entity and/or cross-module data sharing as further described herein.

Content acquisition module 110 acquires supplemental information associated with a list and/or list items, such as pricing information for a particular list item, coupon information for the particular list item, vendors that provide the particular list item, etc. In some scenarios, list creation module 108 notifies content acquisition module 110 when a new list item has been added and, in response to the notification, content acquisition module 110 initiates the acquisition of supplemental information associated with the list item. Alternately or additionally, content acquisition module 110 initiates the acquisition of supplemental information in response to a user selecting a particular list item. As one example, a user can select a particular list item and, in response to the selection, content acquisition module 110 acquires pricing information for the selected list item from different vendors. Various implementations display portions or all of the supplemental information, such as by displaying multiple prices for a list item from different.

List communication module 112 provides the ability to establish communication sessions with other list manager modules. As one example, list communication module 112 can establish and maintain an instant messaging communication session that exchanges content with another instance of a list manager module. In various implementations, a communication session can be established in the context of a particular list item as further described herein. Alternately or additionally, list communication module 112 provides the ability to create list manager shared groups that share list information across multiple devices, instances of list managers, user profiles, or any combination thereof. In turn, the list communication module synchronizes list content across the members of a list manager shared group. For example, some implementations enable a user to create a list manager shared group, where access to the associated list information included in the list manager shared group is authenticated with proper credential information (e.g., a user profile, user identification, password, telephone number, Personal Identification Number (PIN), etc.). By entering the proper credential information in a respective instance of the list manager module, various devices obtain access to the list manager shared group and/or list information. Some implementations of the list communication module 112 provide the ability to share information with devices external to a list manager module as further described herein.

Context acquisition module 114 tracks and/or acquires information corresponding to user interactions with the list manager module and subsequently derives context information about the user. The context information can then be used to provide various types of recommendations that align with various identified user preferences. For instance, by tracking various types of user interactions, context acquisition module 114 can identify a list item that is added multiple times to a same and/or different list, a list item that is purchased multiple times, a frequency of how often a list item is purchased, what vendors are preferred for particular list items (e.g., which vendors are used for particular items), list items with positive user feedback, list items with negative user feedback, and so forth. In turn, context acquisition module 114 can automatically generate a base list that includes user-preferred list items based on a frequency of purchase, a frequency of list inclusion, and so forth. Alternately or additionally, the context information can be used to modify how list items are suggested and/or displayed. As yet another example, the context acquisition module can provide a list of suggested vendors based upon a current location and/or where frequent purchases are made.

Payment module 116 represents functionality that enables a user to initiate an order transaction for various list items and/or perform a purchase transaction. In some implementations, payment module 116 acts as a bridge between the list manager module and third-party payment services. For example, the payment module 116 can display a "Pay Now" control that, when actuated, obscures transaction details performed by the payment module and a third-party payment service to purchase items from a vendor, such as logging onto the third-party payment system, authorizing payment to the vendor, receiving authentication information, transferring list items to a vendor, etc. Alternately or additionally, payment module 116 represents a proprietary payment system internal to list manager module 104.

Computing device 102 also includes communication module 118 to provide external communications to and from the device. For example, list communication module 112 can interface and/or utilize functionality provided by communication module 118 to communicate across a network to other instances of list manager modules. Accordingly, communication module 118 generally represents any suitable combination of hardware, software, and/or firmware used to facilitate the exchange of information with one or more other devices, such as images, addresses, audio, video, commands, queries, messaging, data, and so forth. Some implementations of communication module 118 include one or more protocol stacks associated with a network over which data is exchanged, firmware that drives hardware to generate signals and/or process messages used in maintaining a wireless and/or wired communication session, and so forth. Alternately or additionally, some implementations of communication module 118 include computer networking ports, such as a Transmission Control Protocol (TCP) port, a User Datagram Protocol (UDP) port, a File Transfer Protocol (FTP) port, a Hypertext Transfer Protocol (HTTP) port, an Internet Message Access Protocol (IMAP) port, and so forth. This can include physical communication ports, such as a serial port, a parallel port, a Universal Serial Bus (USB) port, a keyboard port, a display port, an audio port, etc. In various implementations, computing device 102 uses communication module 118 to connect with other devices over communication cloud 120, such as servers 122 and/or remote computing device 124.

Communication cloud 120 generally represents any suitable type of communication network that facilitates a bi-directional link between various computing devices. Accordingly, communication cloud 120 can include multiple interconnected communication networks that comprise a plurality of interconnected elements, such as a wireless local area network (WLAN) with Ethernet access, a wireless telecommunication network interconnected with the Internet, a wireless (Wi-Fi) access point connected to the Internet, an IoT network, and so forth. In this example, communication cloud 120 connects computing device 102 with servers 122 and remote computing device 124, and/or other devices not illustrated here.

Servers 122 represent various types of servers accessible to computing device 102. In some implementations, the servers provide cloud-based services associated with collaborative list management to computing device 102, such as synchronizing changes made to a list at computing device 102 to other devices that are included in a list manager shared group associated with the list, establishing communication sessions, etc. Alternately or additionally, servers 122 interact and/or collaborate with other servers, such as vendor servers or third-party payment services, to gather supplemental information (e.g., pricing information, sale information, coupon information, etc.) and/or make payment transactions with vendors. Accordingly, various implementations of computing device 102 access servers 122 over communication cloud 120 to exchange messages, query for data, and/or invoke services.

Remote computing device 124 represents a user device that shares list information with computing device 102. In some implementations, remote computing device 124 includes an instance of a list manager module 126, similar to list manager module 104. Here, list manager module 126 manages list 128 that represents a list that is synchronized with list 106. For example, in response to computing device 102 editing list items included in list 106, various implementations propagate these changes via list manager module 104, list manager module 126, communication cloud 120, and/or servers 122 to synchronize list 128 with the corresponding changes. In some implementations, computing device 102 and computing device 124 belong to a same list manager shared group that synchronizes the list information across devices. Alternately or additionally, remote computing device 124 receives communications associated with list 106 via other types of communication that are external to the list manager system, such as text messaging, e-mail messaging, etc.

Figure 2:
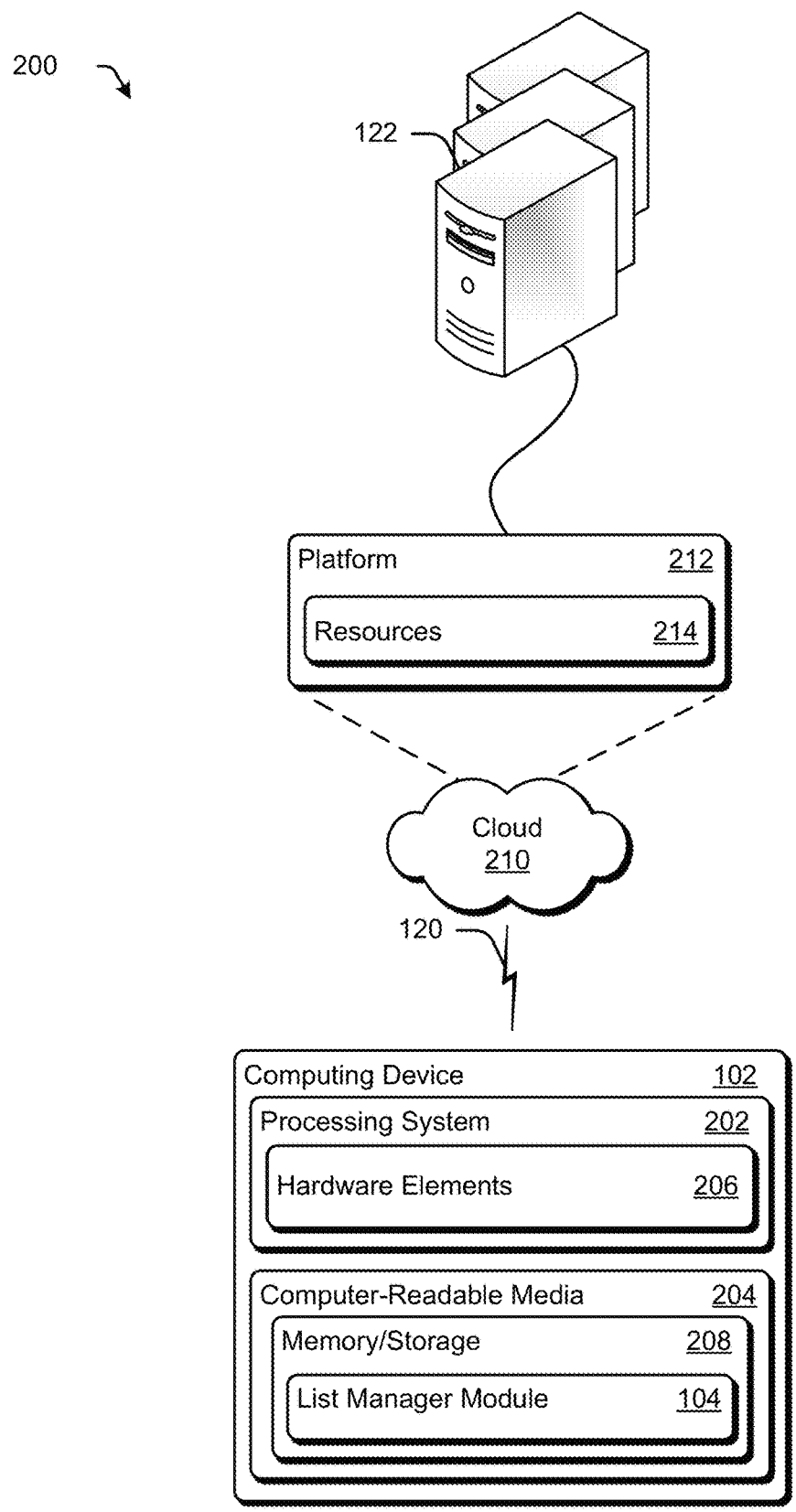
FIG. 2 illustrates an example environment in which cloud-based services can be used to provide collaborative list management capabilities in accordance with one or more implementations.

Consider now FIG. 2 that illustrates an example environment 200 in accordance with one or more implementations. In various implementations, the example described with respect to FIG. 2 can be considered a continuation of the example described with respect to FIG. 1.

Environment 200 includes computing device 102, servers 122, and communication cloud 120 of FIG. 1, where computing device 102 includes a processing system 202, and one or more computer-readable media 204. Processing system 202 is representative of functionality to perform one or more operations using hardware. Accordingly, the processing system 202 is illustrated as including hardware elements 206 that may be configured as processors, functional blocks, and so forth. This may include implementation in hardware as an application specific integrated circuit or other logic device formed using one or more semiconductors. The hardware elements 206 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 204 is illustrated as including memory/storage 208. The memory/storage 208 represents memory/storage capacity associated with one or more computer-readable media. The memory/storage 208 may include volatile media (such as random access memory (RAM)) and/or nonvolatile media (such as read only memory (ROM), Flash memory, optical disks, magnetic disks, and so forth). The memory/storage 208 may include fixed media (e.g., RAM, ROM, a fixed hard drive, and so on) as well as removable media (e.g., Flash memory, a removable hard drive, an optical disc, and so forth). The computer-readable media 204 may be configured in a variety of other ways as further described below. Here, list manager module 104 is illustrated as residing within memory/storage 208, but alternate or additional implementations can implement list manager module 104 using combinations of firmware, hardware, and/or software without departing from the scope of the claimed subject matter, such as hardware elements 206.

Example environment 200 enables multiple devices to be interconnected through servers 122, where servers 122 can be local to the multiple devices or remote from the multiple devices. In one or more implementations, servers 122 are configured as a cloud of one or more server computers that are connected to the multiple devices through a network, the Internet, or other data communication link. This interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one embodiment, a class of target devices is created and experiences are tailored to the generic class of devices. A class of devices may be defined by physical features, types of usage, or other common characteristics of the devices.

The cloud 210 includes and/or is representative of a platform 212 for resources 214. The platform 212 abstracts underlying functionality of hardware (e.g., servers) and software resources of the cloud 210. Resources 214 may include applications and/or data that can be utilized while computer processing is executed on servers that are remote from the computing device 102. For example, while not illustrated here, resources 214 can include portions of list manager module 104.

The platform 212 may abstract resources and functions to connect computing device 102 with other computing devices. The platform 212 may also serve to abstract scaling of resources to provide a corresponding level of scale to encountered demand for the resources 214 that are implemented via the platform 212. Accordingly, in an interconnected device embodiment, implementation of functionality described herein may be distributed throughout the system. For example, the functionality may be implemented in part on the computing device 102 as well as via the platform 212 that abstracts the functionality of the cloud 210.

Having described example operating environments in which various aspects of collaborative list management can be utilized, consider now a discussion of list management in accordance with one or more implementations.

List Management

Lists can be a useful tool that help a person organize various aspects of their lives. For instance, a grocery list can be used to keep track of the various items a person wishes to purchase during a shopping trip to a grocery store. Similarly, a camping list can be used to keep track of items to bring on a camping vacation, items depleted during the last camping trip, etc. Over time, it can be challenging to keep lists accurate and/or synchronized with changes that occur. To illustrate, consider a scenario in which a person adds an item to a grocery list, such as sandwich bread, as a reminder to purchase this item on the next trip to the grocery store. Unbeknownst to them, however, a family member purchases sandwich bread without updating the grocery list. In turn, this causes the grocery list to be outdated. Since the list is outdated, a second loaf of sandwich bread is purchased by the person during a shopping trip, which potentially wastes monetary resources of the household since there is an abundance of sandwich bread that may go unused. As another example, the person generating the grocery list may have researched different stores to find a best price for the sandwich bread but fails to communicate the results of the research to the various family members. In turn, when the family member purchases the sandwich bread, it may be at a higher price than the lowest identified price. Thus, while a list can be a helpful organization tool, there can be supplemental information associated with the list items that goes undiscovered by the user and/or others associated with the list.

Techniques described herein provide collaborative list management services. Various implementations receive selection of a list item included in a list associated with a list manager that provides the collaborative list management services. In response to receiving selection of the list item, one or more implementations receive input to invoke an action in a context associated with the list item, such as establishing a communication session, acquiring supplemental content, sharing list information, generating vendor-based lists, accessing third-party services, and so forth. Accordingly, various implementations invoke the action in the context of the selected list item.

Figure 3:
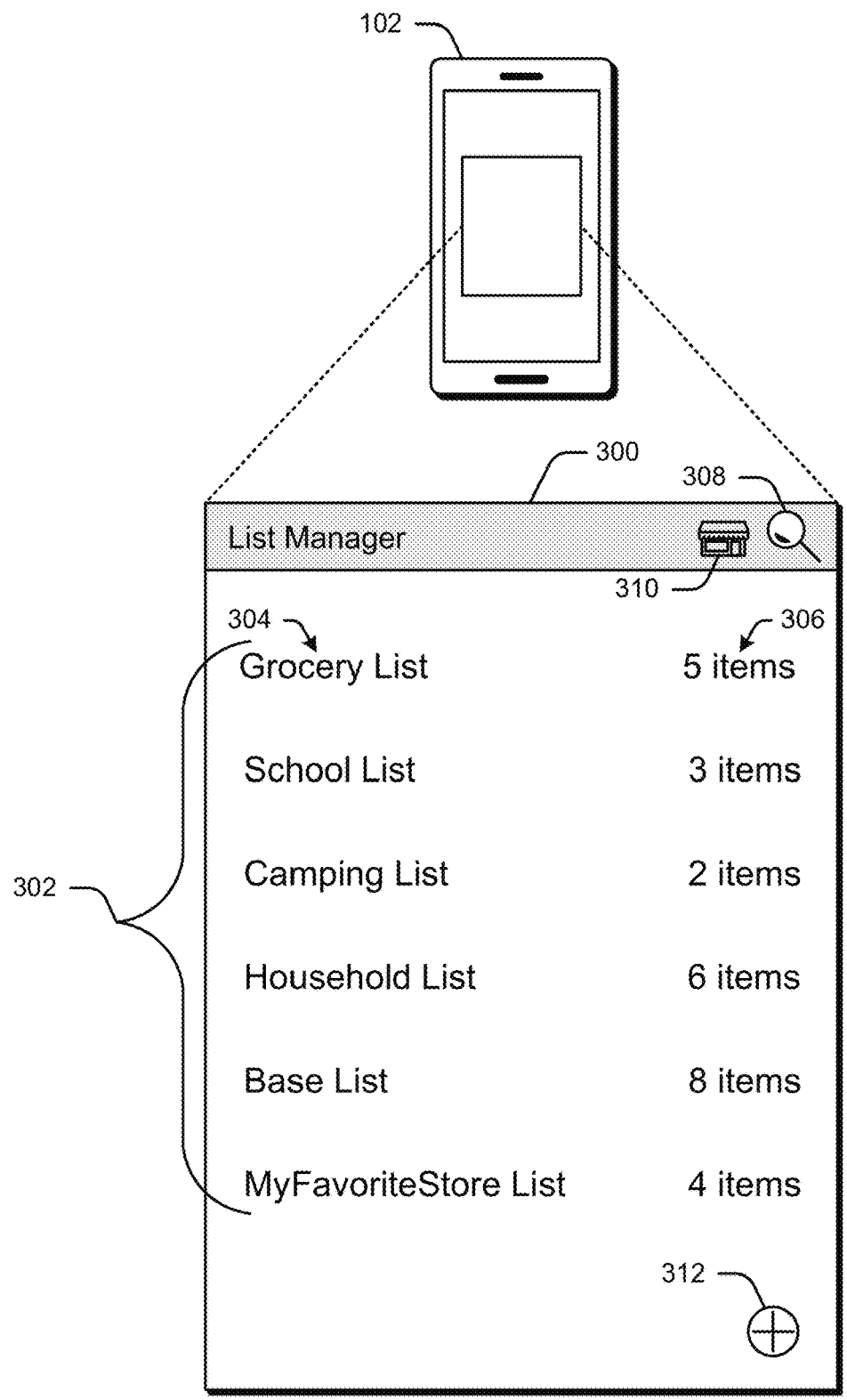
FIG. 3 illustrates an example list manager user interface in accordance with one or more implementations.

FIG. 3 illustrates an example user interface 300 that can be used to manage lists in accordance with one or more implementations. In various scenarios, the example described with respect to FIG. 3 can be considered a continuation of one or more examples described with respect to FIGS. 1 and 2. In FIG. 3, computing device 102 of FIG. 1 renders user interface 300 to provide access to the various list management features supported by list manager module 104 (not illustrated here).

Here, user interface 300 displays an assortment of six different lists, generally labeled as lists 302. It is to be appreciated that the six lists displayed here are used for discussion purposes, and that any other number of lists can be displayed and/or managed without departing from the scope of the claimed subject matter. Each respective list included in lists 302 has a respective name and list count. For example, list 304 is labeled as "grocery list" and includes five items, which is further indicated via list count 306. Accordingly, user interface 300 displays a summary view of some or all lists that are currently being managed by the list manager module.

User interface 300 also includes a search control 308, a vendor sort control 310, and a list creation control 312. Search control 308 provides the ability to search data, such as a variety of list information managed by the list manager and/or information external to the list manager. For instance, in response to being actuated, some implementations of search control 308 display a text field to receive a key word and/or phrase, such as a displaying a text field on a separate pop-up window or user interface, replacing search control 308 with a text field, etc. Upon receiving the key word and/or phrase as search criteria, the list manager searches for data or information that includes an exact match, or matches within a predetermined threshold or percentage, to the search criteria. Any type of data can be retrieved from a search, such as list names, list items, store preferences, pricing information, contacts, hyperlinks, supplemental information, and so forth. In various implementations, the search includes interfacing with a third-party search engine that is external to the list manager.

Vendor sort control 310 provides the ability to sort list items based on an assigned vendor. For example, as further described herein, a first list item included in a first list can be assigned to a same vendor as a second list item included in a second list. By actuating vendor sort control 310, various implementations generate vendor-based lists that consolidate items from different lists based on their assignment to a same store. Thus, actuation of the vendor sort control would consolidate the first list item and the second list item into a list associated with the vendor. The generation of a vendor-based list can be achieved in any manner, such as by copying the list items from each respective list and generating a vendor list using the copied items, inserting a cross-reference link to each respective list item in the vendor list, moving list items from a first list to the vendor list, etc. This allows the user to easily identify list items across multiple lists that are assigned to the same vendor, rather than having to search each of the multiple lists manually.

Figure 4A:
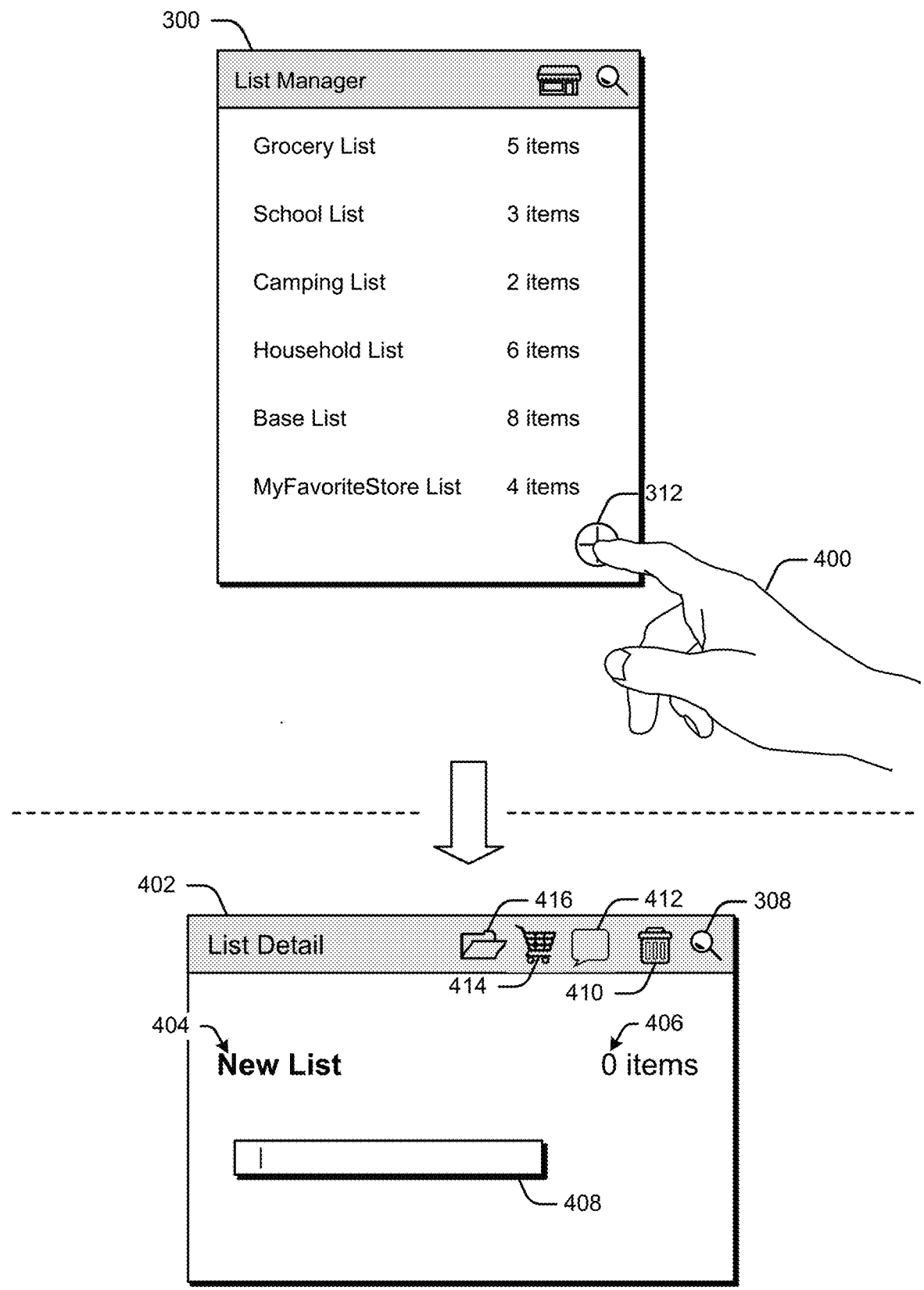

List creation control 312 provides the ability to create a new list. To further demonstrate, consider now FIGS. 4a and 4b that illustrate an example of creating a new list in accordance with one or more implementations. In various scenarios, the example described with respect to FIGS. 4a and 4b can be considered a continuation of one or more examples described with respect to FIGS. 1-3. Collectively, FIGS. 4a-4b illustrate an example progression of events over an arbitrary time period. Here, the progression begins in the upper portion of FIG. 4a and then moves to the lower portion of FIG. 4a. The progression then proceeds to the upper portion of FIG. 4b, followed by the lower portion of FIG. 4b. It is to be appreciated that the progression of events described with respect to FIGS. 4a and 4b are for discussion purposes, and that any other ordering, omission, and/or addition to the events can occur without departing from the scope of the claimed subject matter.

The upper portion of FIG. 4a includes user interface 300 of FIG. 3 that displays list creation control 312. To create a list, user 400 actuates the control using a touch-gesture. However, other types of input can be used as well to create a new list, such as input through a soft key, a drop-down menu, keyboard stroke(s), a mouse-based interface, an active and/or passive stylus, and so forth.

Moving to the lower portion of FIG. 4a and in response to the actuation of list creation control 312, the list manager presents user interface 402. The presentation of user interface 402 can be achieved in any suitable manner, such as through a pop-up window that overlays on top of user interface 300 and/or by replacing user interface 300 with the new user interface. Relative to user interface 300, user interface 402 includes additional details about the newly created list. For example, user interface 402 displays a list identifier 404 that can either be a default list name provided by the list manager and/or a user-defined list name. User interface 402 also displays a list count 406 that indicates a current count of items included in the list. Since the list being displayed by user interface 402 is a newly created list, list count 406 indicates that the list currently includes zero items. User interface 402 also includes a text field 408 that provides the user with the ability to add items to the new list, but other types of mechanisms can alternately or additionally be included as well. For example, user interface 402 can include a Quick Response (QR) code control that enables a user to capture and/or upload an image of a QR code into the list manager for analysis. In response to identifying an item from the QR code, some embodiments insert the identified item into the list as a list item. As another example, user interface 402 can include audible input controls that, in response to being actuated, capture audio input and process the audio input using speech-to-text algorithms to generate text. In turn, the generated text can be inserted into the newly created list as a list item.

User interface 402 also includes various controls that enable interaction with the newly created list. For example, user interface 402 includes search control 308 for searching information, such as information local to the list manager, information local to the newly created list, information global across the Internet, etc. Additional controls include delete control 410, communication control 412, vendor control 414, and organization control 416. Delete control 410 provides the ability to delete the current list being displayed by user interface 402 and/or a list item included in the current list. Communication control 412 provides the ability to initiate a communication session with another user in the context of the current list and/or a selected list item, while vendor control 414 provides the ability to assign list item(s) to particular vendor as further described herein. Organization control 416 provides the ability to organize, copy, and/or move items between lists. It is to be appreciated that the various controls described with respect to FIGS. 4a and 4b are for discussion purposes, and that other types of controls can be displayed to provide various types of user interaction with the current list and/or list items within the list.

Continuing on to the upper portion of FIG. 4b, text field 408 has received text input in the form of text entry 418. Upon receiving a signal that the text entry has completed, such as through receiving a return character, the process moves to the lower portion of FIG. 4b where an item is added to the newly created list based on text entry 418. This can include inserting the characters received via text entry 418 as a list item and/or by inserting a list manager list item that corresponds to the text entry into the list. Here, a list manager list item denotes a list item that includes additional and/or supplemental information not displayed via user interface 402. For instance, various implementations maintain a database of list items that include supplemental information about the list items, such as a text string that identifies the list item, a Universal Product Code (UPC), a QR code, user, current pricing information, user context information (e.g., purchase frequency, user ratings, brand preferences, vendor preferences, etc.), and so forth. Thus, adding a list manager list item to a newly created list includes adding or linking the supplemental information to the newly created list as well. For simplicity's sake, this disclosure refers to an item included in a list as a list item, but it is to be appreciated that references to this phrase can alternately or additionally be interchanged with the phrase list manager list item. In other words, references to a list item can interchangeably imply a list manager list item.

To add a list item to a list, some implementations match the received information to a database as further described herein. To further demonstrate, consider list item 420 that has been newly added to the current list. Various implementations use the text characters added within text field 408 as search criteria to select an entry in the database with a text string identifier whose characters exactly match, or match within a predetermined threshold or percentage. Thus, upon receiving the text characters "grapes", the list manager can scan the database to find an entry with a text string identifier that matches, or closely matches, "grapes" relative to other entries. In turn, upon identifying a database entry, the selected entry is then added to the list as a list item, which can include adding and/or linking any supplemental information for the entry to the list.

Accordingly, in the lower portion of FIG. 4*b*, list item 420 reflects a list item that is included in the newly created list. The addition of this item can also be seen in list count 406, which has an updated value that reflects the newly added list item. Similarly, text field 408 has visually moved below list item 420 to provide a visual indication that list item 420 has been entered into the list, and that text field 408 is ready to receive another entry. The list manager also assigns a selectable control 422 to the newly added list item to provide a mechanism for selecting the newly added item.

In various implementations, each respective list item has a respective selectable control, where a selectable control can be in an enabled state or a disabled state. In turn, the state of the selectable control can be used to determine whether the corresponding list item has been selected or not. For example, when selectable control 422 is in a disabled state, user interface 402 displays the control as a hollow circle as a visual indicator of its state. Since selectable control 422 is assigned to item 420, the list manager determines that the corresponding list item (e.g., grapes) is in an unselected state based upon the state of selectable control 422. Conversely, when the selectable control 422 is in an enabled state, user interface 402 displays the control as a solid circle as a visual indication of the control's state, and the list manager determines that the corresponding list item is in a selected state.

Figure 5A:
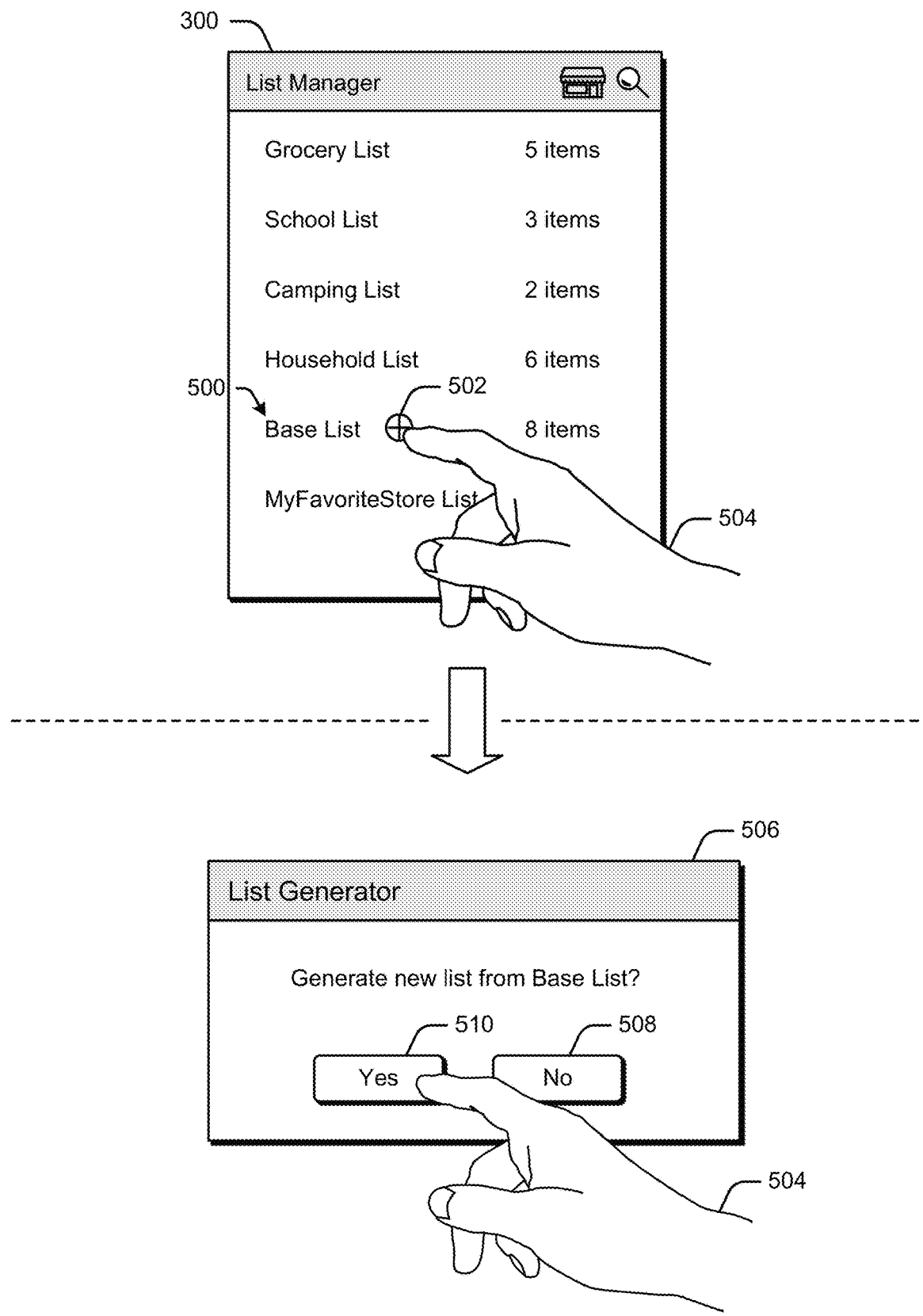
FIGS. 5*a* and 5*b* illustrate creating a list using a base list in accordance with one or more implementations.
Figure 5B:
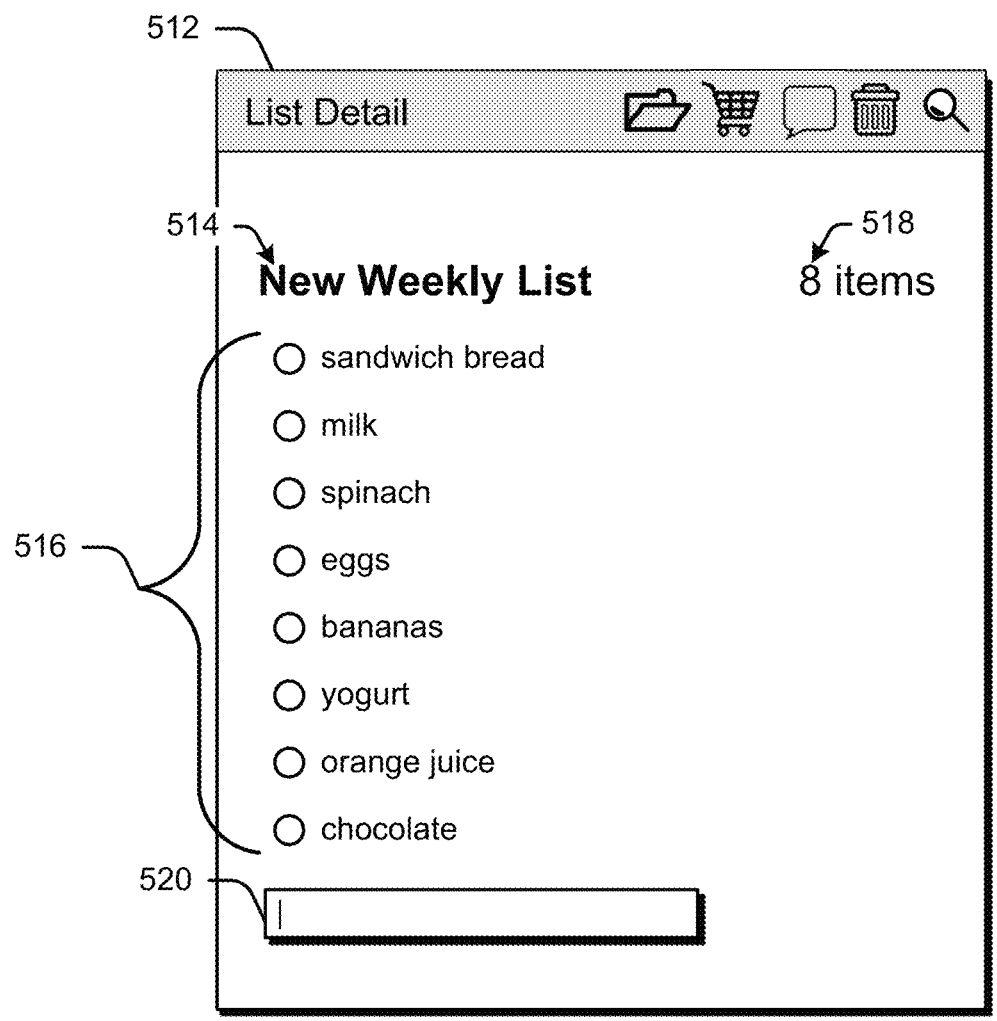

While the example described with respect to FIGS. 4*a* and 4*b* demonstrate a user manually creating a new list through a creation control, other implementations provide alternate or additional list creation mechanisms. To further illustrate, consider now FIGS. 5*a* and 5*b* that illustrate generating a new list using a base list in accordance with one or more implementations. In various scenarios, the example described with respect to FIGS. 5*a* and 5*b* can be considered a continuation of one or more examples described with respect to FIGS. 1-4*b*. Collectively, FIGS. 5*a* and 5*b* illustrate an example progression of events over an arbitrary time period. In this example, the progression begins in the upper portion of FIG. 5*a* and then moves to the lower portion of FIG. 5*a*. The progression proceeds to FIG. 5*b*. It is to be appreciated that the progression of events described with respect to FIGS. 5*a* and 5*b* are for discussion purposes, and that any other ordering, omission, and/or addition to the events can occur without departing from the scope of the claimed subject matter.

The upper portion of FIG. 5*a* includes user interface 300 of FIG. 3 that displays a collection of lists being managed by a list manager. Included in the collection is a base list 500 that represents a grouping of list items that have been identified as having value to the user. For example, some implementations automatically generate base list 500 from context information gathered by tracking user interactions and/or purchases. To demonstrate, consider a scenario in which a user generates a new grocery list on a weekly basis. Various implementations generate context information about the user, such as repeat items that are included on multiple lists, and use the context information to automatically generate base list 500 without the user manually generating the list. The context information can include any combination of data and/or metrics, such as frequency of when a list item is added, how often a list item is purchased, time between purchasing the list item, and so forth. In turn, the list manager can use various types of criteria to determine when a particular list item has value to a user, such as by determining that the particular list item is of value when the list item has been purchased a number of times that meets or exceeds a predetermined threshold. In turn, the list manager automatically generates the base list using the list items identified as being of value. Alternately or additionally, base list 500 can be a manually generated list where a user manually adds various list items to the base list in a manner similar to that described with respect to FIGS. 4*a* and 4*b*.

In this example, user interface 300 includes selectable control 502 that is associated with generating a new list based off of base list 500. For example, user interface 300 can include multiple selectable controls, where each respective selectable control is associated with a respective list included in the collection. Some implementations allow the user to manually generate a new list based off of an existing list, such as through the actuation of the respective selectable control. Alternately or additionally, various implementations automatically generate a new list from a base list without user intervention. Consider again the scenario in which a user generates a weekly grocery list. Various implementations gather context information that identifies the repeated action of generating a new list once a week, and then automatically generate a new list with the identified frequency using a base list of list items. In some implementations, the automatic generation of a list can be influenced by user configuration parameters, such as user-definable parameters that indicate how often to create a new list, which list to use as a base for the new list, etc. In turn, the list manager can automatically generate a new list(s) according to the user-defined parameters. In FIG. 5*a*, user 504 manually generates a new list by actuating selectable control 502.

Moving to the lower portion of FIG. 5*a*, and in response to the actuation of selectable control 502, the list manager optionally displays user interface 506 that prompts for confirmation or rejection of the new list creation. Accordingly user interface includes 506 control 508 that can be actuated to terminate the creation of a new list, and control 510 can be actuated to verify the creation of the new list. Here, user 504 actuates control 510 to confirm the request.

Proceeding to FIG. 5*b*, a newly created list is displayed in user interface 512. Here, list identifier 514 reflects a default name that is used to identify the newly created list, but it is to be appreciated that this name can be edited and/or changed by the user. In creating the new list, various implementations copy list items from the base list into the new list. Accordingly, the newly created list has been automatically populated with list items 516 from base list 500. The automatic inclusion of these list items is further reflected in list count 518 that indicates the new list includes eight items. User interface 512 also includes text field 520 to enable new list items to be added, but alternate or additional mechanisms can be employed as well. Similar to the example described with respect to FIGS. 4*a* and 4*b*, each list item has a respective selection control which can be used to select a particular list item. In turn, various implementations can apply and/or associate various actions to a selected list item.

Figure 6:
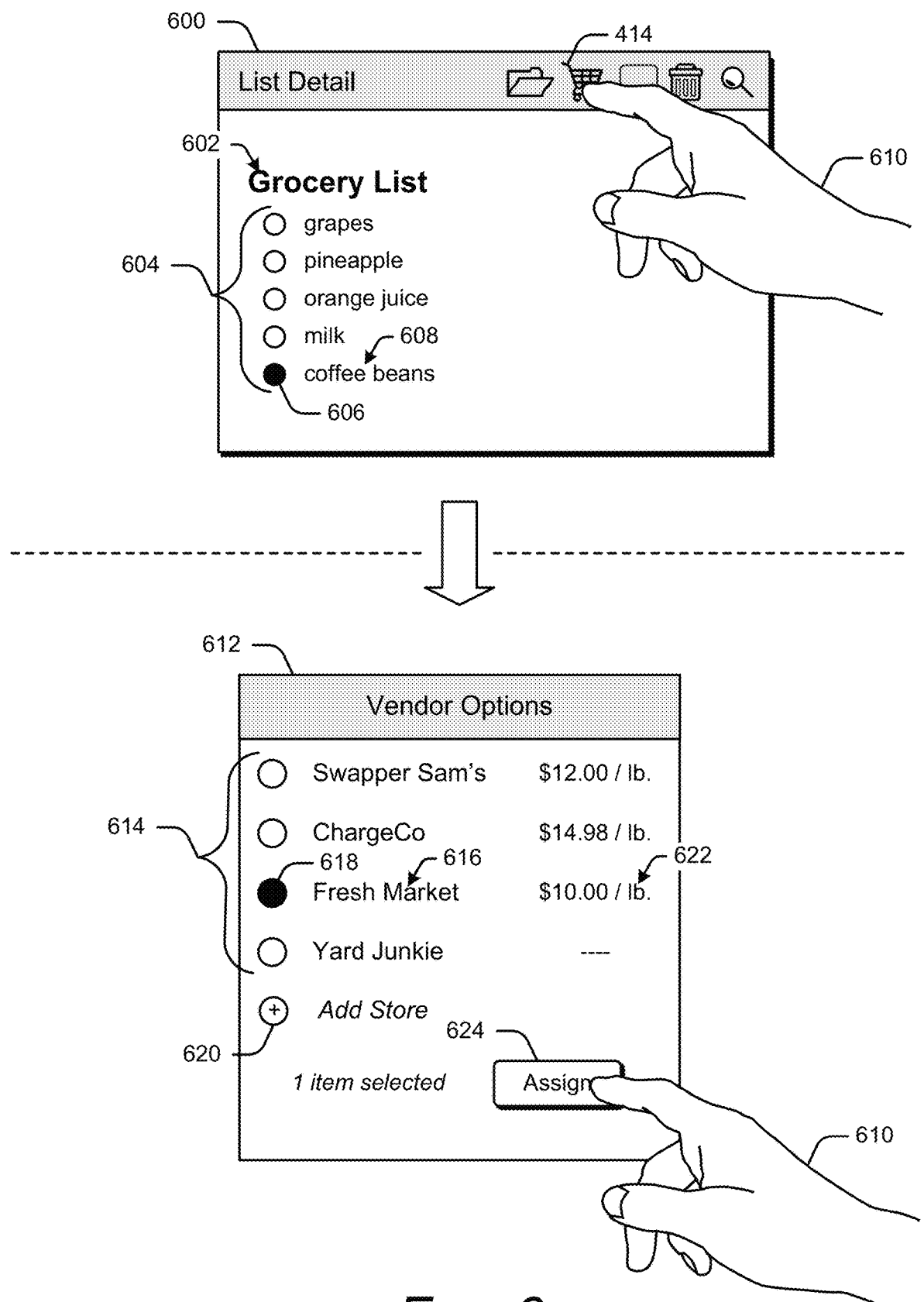
FIG. 6 illustrates an example of assigning a list item to a vendor in accordance with one or more implementations.

To demonstrate, consider now FIG. 6 that illustrates an example of sorting list items in accordance with one or more implementations. In various scenarios, the example described with respect to FIG. 6 can be considered a continuation of one or more examples described with respect to FIGS. 1-5b. FIG. 6 illustrates an example progression of events over an arbitrary time period, where the progression begins in the upper portion of FIG. 6 and then moves to the lower portion of FIG. 6.

The upper portion of FIG. 6 includes user interface 600 that displays list items included in a specific list. Here, list identifier 602 denotes the particular list being displayed, while list items 604 correspond to the list items included in the particular list. As further described herein, each respective item included in list items 604 has a respective selectable control that allows for selection the respective list item. For example, selectable control 606 corresponds to list item 608 (e.g., coffee beans), and is in an enabled state as denoted visually through the display of a solid circle. Since list item 608 is in a selected state, various actions and/or manipulations can be applied to that list item.

To further demonstrate, consider now a scenario in which user 610 decides to assign list item 608 to particular store. Since list item 608 is in a selected state, user 610 actuates vendor control 414 of FIG. 4 to initiate assigning list item 608 to a store and/or vendor. While user interface 600 displays list item 608 as the only selected item, other implementations support applying an action to multiple list items simultaneously without departing from the scope of the claimed subject matter. In other words, multiple list items can be in a selected state at the same time, and an action can be applied to the multiple list items through a single input command.

Moving to the lower portion of FIG. 6, the list manager displays user interface 612 in response to the actuation of vendor control 414. User interface 612 can be displayed in any suitable manner, such as by replacing user interface 600, being overlaid on top of user interface 600, etc. Here, user interface 612 includes a collection of suggested vendors 614, where each respective vendor has a respective selectable control. For example, vendor 616 has a respective selectable control 618 that is in an enable state. Accordingly, since selectable control 618 is enabled, the list manager determines that vendor 616 is in a selected state. While the suggested vendors 614 represent a list of vendors automatically selected by the list manager, user interface 612 also includes selectable control 620 that, when actuated, enables the user to manually browse and select another vendor not be included in the list of suggested vendors.

One or more implementations optionally display pricing information for vendors that have availability of the selected list item. Accordingly, user interface 612 displays a respective purchase price for each vendor of the suggested vendors. For example, price 622 corresponds to the purchase price of list item 608 at vendor 616. In other words, the vendor "Fresh Market" has a purchase price of $10.00 a pound for coffee beans. The pricing information can be obtained in any suitable manner, such as by using UPC information obtained from a database to query each respective vendor of the suggested vendors for pricing information as further described herein. In turn, the list manager displays pricing information to help provide the user with supplemental information without the user manually requesting the information. This not only aids the user in making an informed decision, but additionally provides each vendor with the same sale opportunity independent of the vendor's operating size. For instance, a small distributor of coffee beans is able to advertise purchase opportunities to a customer using the same forum as a large distributor of coffee beans through the list manager. This provides the small distributor with an advertising platform equal to the large distributor. For instance, a large distributor may have more resources for advertising, branding, product placement, etc. relative to a small distributor, thus giving the large distributor a sale advantage. The list manager pricing presentation allows a small distributor to compete in a same forum as a larger distributor by supporting the price query requests from the list manager as further described herein.

Returning to the lower portion of FIG. 6, user 610 assigns vendor 616 to the selected item (e.g., list item 608) by actuating control 624. This process can be repeated for a portion or all of the list items included in list items 604, where each list item can be assigned to the same vendor or different vendors. Alternately or additionally, different list items in different lists can be assigned to vendors as well. In turn, various implementations provide the ability to generate vendor based-lists based on the assignments.

Figure 7:
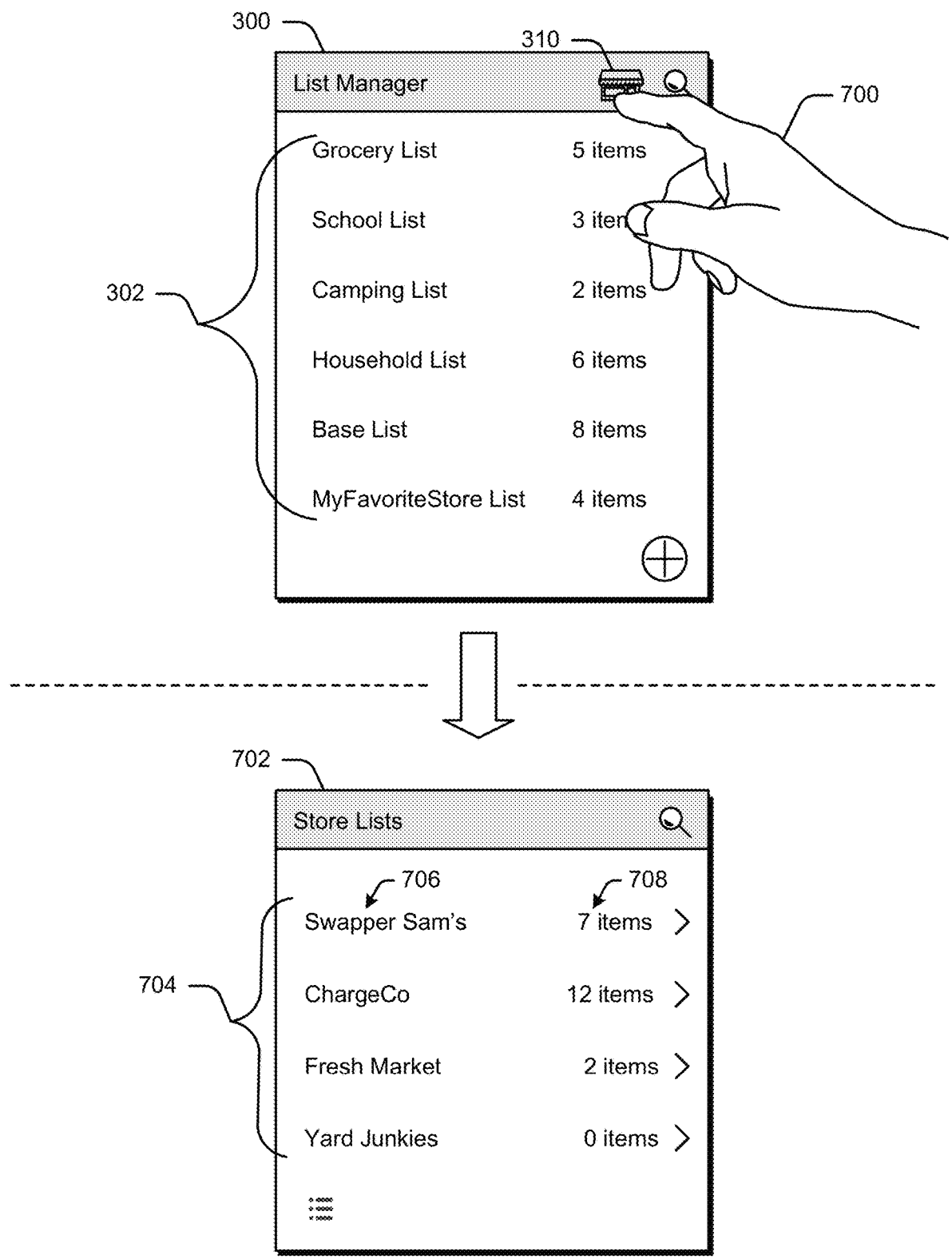
FIG. 7 illustrates an example of sorting list items from multiple lists into vendor-based lists in accordance with one or more implementations.

To further demonstrate, consider now FIG. 7 that illustrates an example of generating vendor-based lists in accordance with one or more embodiments. In various scenarios, the example described with respect to FIG. 7 can be considered a continuation of one or more examples described with respect to FIGS. 1-6. FIG. 7 illustrates an example progression of events over an arbitrary time period, where the progression begins in the upper portion of FIG. 7 and then moves to the lower portion of FIG. 7.

FIG. 7 includes user interface 300 from FIG. 3 that displays lists 302 and vendor sort control 310. As further described herein, lists 302 can include any combination of user-defined lists and/or automatically generated lists. Assume now that at least a portion of the list items included in the collection of lists 302 have been assigned to vendors. To sort the list items based on vendors, user 700 actuates vendor sort control 310 via a touch-gesture input, but other types of inputs can be used as well to generate vendor-based lists.

Moving to the lower portion of FIG. 7 and in response to the actuation of vendor sort control 310, various implementations generate vendor-based lists. Here, user interface 702 includes vendor lists 704 that represent a collection of lists generated by the list manager. While illustrated on a separate user interface as user interface 300, other implementations include the newly generated vendor-based lists in lists 302 of user interface 300. In other words, the vendor lists 704 can be considered new lists that are added to lists 302, rather than replacing lists 302, and represent a reorganization of various list items included in lists 302.

Each respective list generated in the vendor lists 704 corresponds to a particular vendor and/or store. For instance, vendor list 706 corresponds to a vendor named "Swapper Sam's" and includes seven items, as denoted by list count 708. The collection of seven items included in the Swapper Sam's list can be a combination of list items extracted from various lists included in lists 302. As one example, the seven items included in vendor list 706 can include a combination of two items from "Household List", three items from "Grocery List", one item from "Camping List", one item from "MyFavoriteStore list", and zero items from "Base List" and "School List". To reorganize the list items into vendor lists, various implementations copy the list items from lists 302 into the newly generated lists 704 to duplicate the entries. Alternately or additionally, the list items can be reorganized by inserting cross-references into the vendor lists that reference the vendor-assigned list items, such as a cross-reference to a database and/or a cross-reference to a list included in lists 302. In the example described with respect to FIG. 7, the vendor-based lists generated correspond to the collection of suggested vendors 614 of FIG. 6. In other words, each vendor included in suggested vendors 614 has a corresponding vendor-based list.

To identify suggested vendors, some implementations include intelligent tracking to generate context information that identifies a user's preferences with respect to vendors, such as by identifying what vendor more purchases are made at relative to other vendors, what list items are purchased at particular vendors, and so forth. This can include tracking user preferences over a group of users, such as tracking the various members included in a list manager shared group. Consider a scenario in which a family establishes a list manager shared group for a grocery list. The intelligent tracking can track user preferences for each member included in the list manager shared group and identify what vendors to include as suggested vendors based upon the information gathered across the list manager shared group. Alternately or additionally, vendors can be identified as a suggested vendor be based upon a current location.

Figure 8:
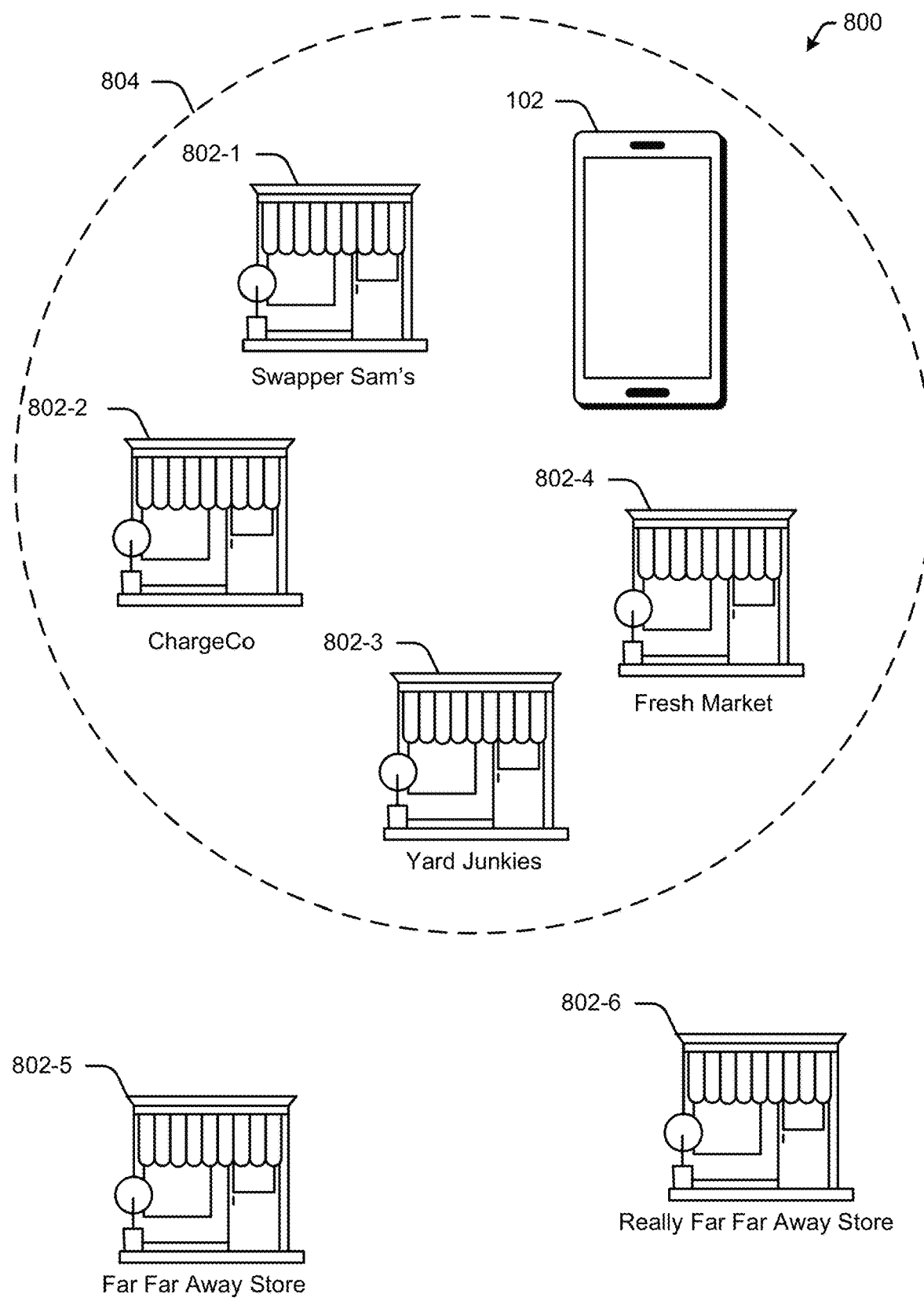
FIG. 8 illustrates an example of identifying suggested vendors in accordance with one or more implementations.

To further demonstrate, consider now FIG. 8 that illustrates an example environment 800 that identifies suggested vendors in accordance with one or more implementations. In various scenarios, the example described with respect to FIG. 8 can be considered a continuation of one or more examples described with respect to FIGS. 1-7.

Environment 800 includes computing device 102 of FIG. 1, as well as several vendors, labeled here as vendor 802-1, vendor 802-2, vendor 802-3, vendor 802-4, vendor 802-5, and vendor 802-6 respectively. Each vendor is physically located at a different geographical position from one another, as well as computing device 102. Various implementations determine which vendors to select as suggested vendors based upon the geographical positions of each vendor and/or the location of each vendor relative to computing device 102. For example, various implementations determine a current location of computing device 102, such as through the use of a Global Positioning System (GPS) receiver within computing device 102 that determines a geographical position using information received from a Global Navigation Satellite System (GNSS). Alternately or additionally, the computing device can extract location information from a Wi-Fi and/or cellular connection. It is to be appreciated that these examples are merely for discussion purposes, and that the current location of computing device 102 can be identified in any other suitable manner. In response to determining a current location of computing device 102, various implementations identify which vendors reside within a pre-determined proximity to the computing device.

In FIG. 8, computing device 102 has defined boundary 804 as having a predefined size and shape. While FIG. 8 illustrates the size and shape of boundary 804 as having a fixed size and shape, alternate or additional implementation define boundary 804 more dynamically, such as by querying the strength of communication signals between computing device 102 and a respective vendor over a wireless interface. Once a boundary has been defined, computing device 102 determines which vendors reside within or at the boundary, and which vendors reside outside of the boundary. This can be achieved in any suitable manner, examples of which are provided herein. In some implementations, the vendor reports a street address, and the computing device determines a relative location based on the street address and a current location of the computing device. Here, computing device 102 identifies that vendors 802-1 through 802-4 reside within boundary 804, and subsequently determines to include these vendors in the collection of suggested vendors. Conversely, computing device 102 determines that vendors 802-5 and 802-6 reside external to the boundary, and subsequently excludes these vendors from the collection of suggested vendors.

Figure 9:
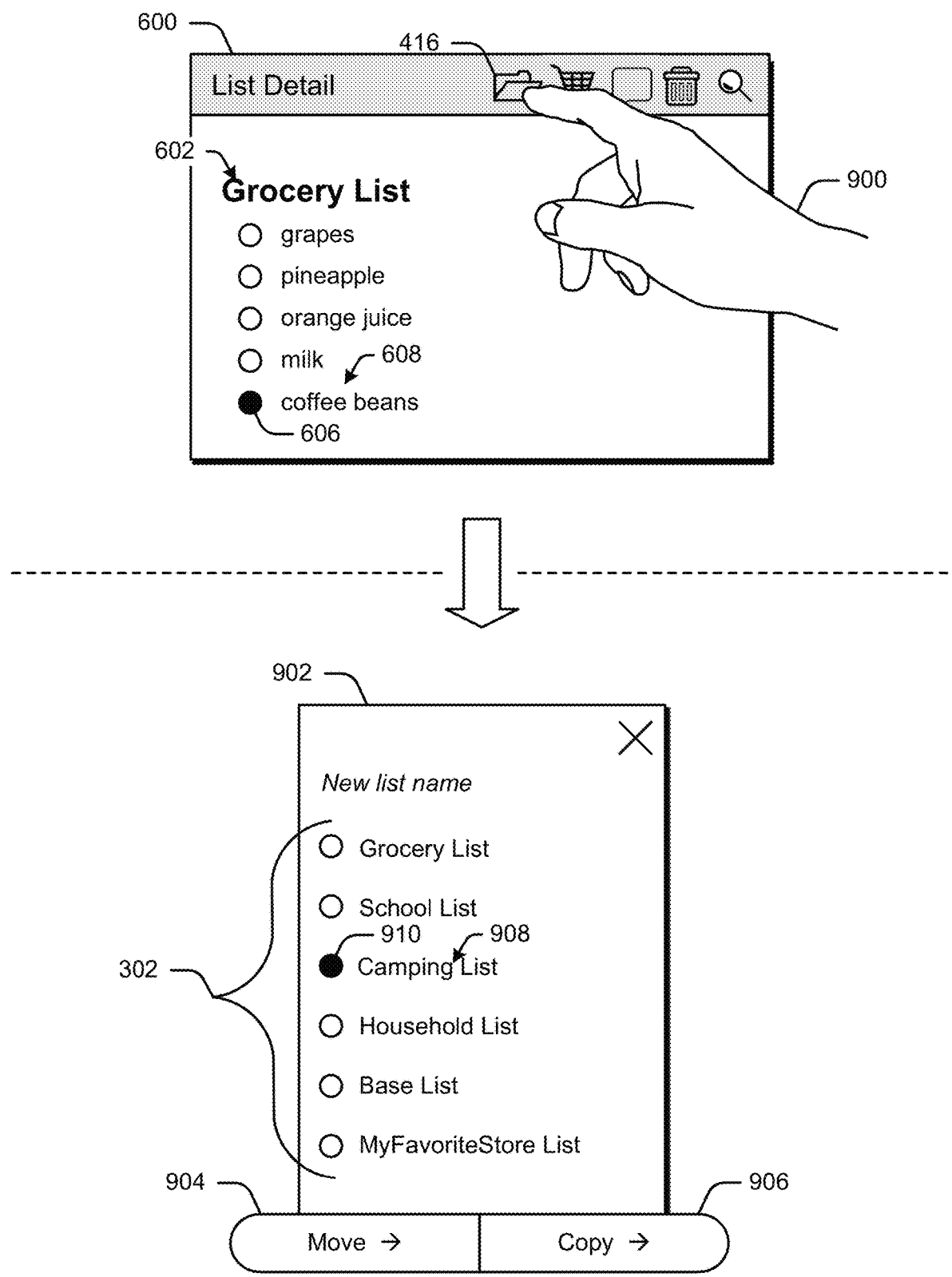
FIG. 9 illustrates an example of organizing list items between lists in accordance with one or more implementations.

In addition to identifying suggested vendors and sorting list items based on suggested vendors, other types of actions can be applied to a list item. To further demonstrate, consider now FIG. 9 that illustrates an example of organizing list items in accordance with one or more implementations. In various scenarios, the example described with respect to FIG. 9 can be considered a continuation of one or more examples described with respect to FIGS. 1-8. FIG. 9 illustrates an example progression of events over an arbitrary time period, where the progression begins in the upper portion of FIG. 9 and then moves to the lower portion of FIG. 9. FIG. 9 includes user interface 600 of FIG. 6 that displays a variety of list items included in the list associated with list identifier 602. Among the various list items, list item 608 is in a selected state, which is further indicated through selectable control 606 having a solid circular shape. Since user 900 desires to organize the selected item, such as by moving list item 608 from one list to another, organization control 416 of FIG. 4 is actuated through a touch-gesture input.

Moving to the lower portion of FIG. 9, the list manager displays user interface 902 in response to the actuation of organization control 416. In addition to lists 302 from FIG. 3, user interface 902 includes move control 904 and copy control 906. The actuation of move control 904 moves a selected list item (and any supplemental information) from a current list to a selected list, while the actuation of copy control 906 would copy the selected list item (and any supplement information) from a current list to the selected list. In the context of this example, list 908 represents the currently selected list, which is further indicated visually by selectable control 910 having a solid shape. Accordingly, if move control 904 is actuated, list item 608 is removed from the list associated with list identifier 602 and added to list 908. In other words, the list item coffee beans is removed from the grocery list, and added to the camping list. Alternately or additionally, in response to the actuation of copy control 906, various implementations copy list item 608 to list 908 without removing the list item from the original list. In other words, the coffee beans list item remains in the grocery list and is additionally added to the camping list. Thus, various implementations provide the ability to organize list items.

Figure 10:
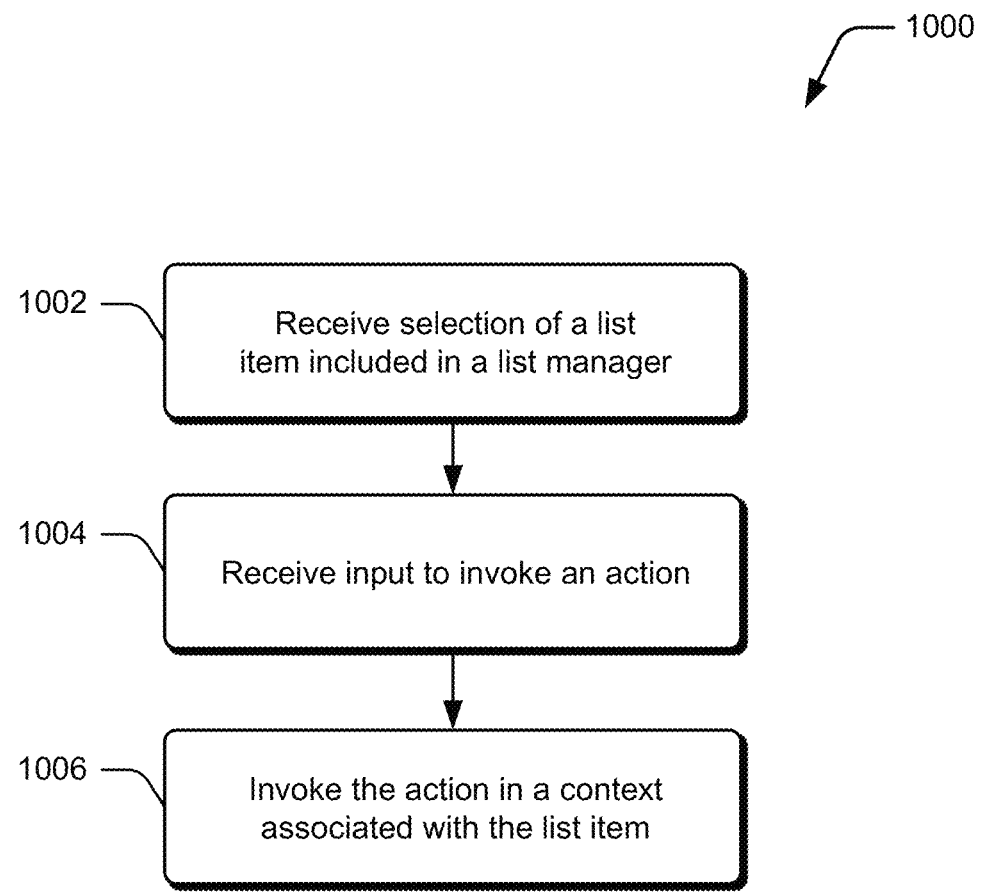
FIG. 10 illustrates a flow diagram of an example method that invokes actions in the context of a list item in accordance with one or more implementations.

Now consider FIG. 10 that illustrates an example method 1000 that invokes an action in the context of a list item in accordance with one or more implementations. The method can be performed by any suitable combination of hardware, software, and/or firmware. In at least some embodiments, aspects of the method can be implemented by one or more suitably configured hardware components and/or software modules, such as list manager module 104 of FIG. 1 and/or platform 212 of FIG. 2. While the method described in FIG. 10 illustrates these steps in a particular order, it is to be appreciated that any specific order or hierarchy of the steps described here is used to illustrate an example of a sample approach. Other approaches may be used that rearrange the ordering of these steps. Thus, the order steps described here may be rearranged, and the illustrated ordering of these steps is not intended to be limiting.

At 1002, various implementations receive selection of a list item included in a list associated with a list manager. In various implementations, the list manager provides collaborative services, such as the acquisition of supplemental information, sharing list information across a list manager shared group, purchasing list items online, establishing communication sessions, and so forth. Accordingly, the selected list item can include list items/list manager list items with supplemental information and/or can be manipulated via the various services provided by the list manager as further described herein.

In response to receiving selection of the list item, one or more implementations receive input to invoke an action associated with the list item at 1004. The action can be any suitable type of action, such as an assignment action (e.g., vendor assign mention, person assignment, etc.), organization action, a share action, a communication session related action, an order transaction, and so forth. In various implementations, the input is received directly from an input mechanism associated with invoking the action, such as a control associated with assigning the input item to a vendor and/or a person. Alternately or additionally, the input is received indirectly, such as a secondary input. For example, consider a scenario in which a user directly inputs a command to open and/or access a list. Now assume that in response to accessing the list, various implementations select all the list items within the list and invoke an action to gather supplemental information for each list item. In such a scenario, the direct user input corresponds to accessing the list while the secondary input corresponds to gathering the supplemental information in response to the "list access" input. Accordingly, and in response to receiving input to invoke an action, various implementations invoke the action in a context associated with the selected list item at 1006.

Figure 11:
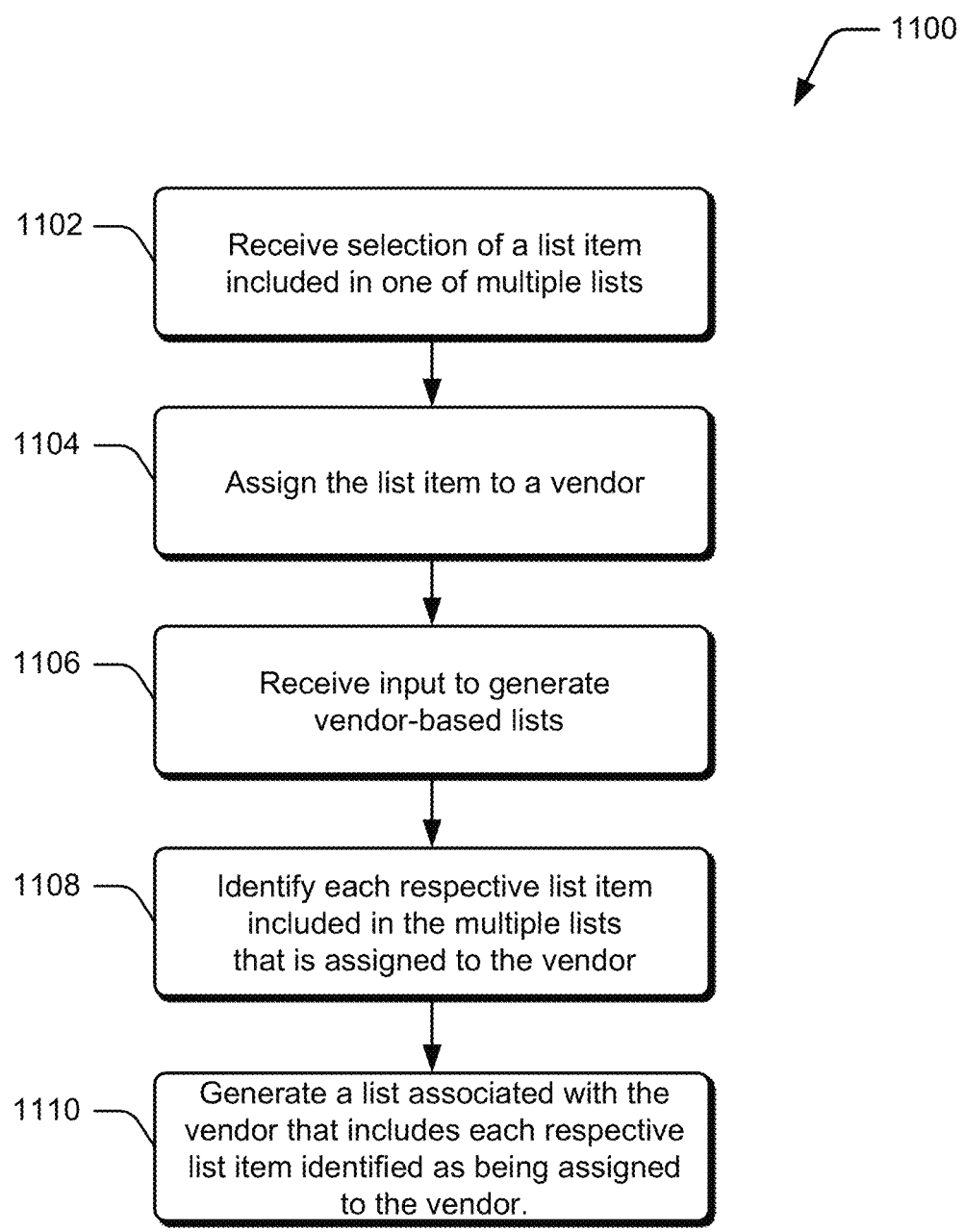
FIG. 11 illustrates a flow diagram of an example method that generates a vendor-based list in accordance with one or more.

Now consider FIG. 11 that illustrates an example method 1100 that generates a vendor-based list using items from multiple lists in accordance with one or more implementations. The method can be performed by any suitable combination of hardware, software, and/or firmware. In at least some embodiments, aspects of the method can be implemented by one or more suitably configured hardware components and/or software modules, such as list manager module 104 of FIG. 1 and/or platform 212 of FIG. 2. While the method described in FIG. 11 illustrates these steps in a particular order, it is to be appreciated that any specific order or hierarchy of the steps described here is used to illustrate an example of a sample approach. Other approaches may be used that rearrange the ordering of these steps. Thus, the order steps described here may be rearranged, and the illustrated ordering of these steps is not intended to be limiting.

At 1102, one or more implementations receive selection of a list item included in a list that is included in multiple lists. In various implementations, the multiple lists are associated with a list manager that provides collaborative services, such as the acquisition of supplemental information, sharing list information across a list manager shared group, purchasing list items online, establishing communication sessions, and so forth. Accordingly, the selected list item can include list items/list manager list items with supplemental information and/or can be manipulated via the various services provided by the list manager as further described herein.

At 1104, various implementations assign the list item to a vendor. For example, some implementations provide a collection of suggested vendors to assign to the list item, where selection of a vendor from the collection determines which vendor to assign the list item to. The suggested vendors can determined in any suitable manner, such as by determining the vendors based on location, user-preferences, user context information, and so forth. Alternately or additionally, various implementations receive manual input that identifies a vendor that has not been suggested. In response to assigning a list item to a vendor, various implementations store the vendor information in a database and/or link the vendor information to the list item. In turn, the stored vendor information can be extracted and/or used to gather supplemental information as further described herein.

Various implementations receive input to generate vendor-based lists. Accordingly, in response to receiving the input, one or more implementations identify each respective list item included in the multiple lists that are assigned to the vendor. This process can repeat for each vendor included in the collection of suggested vendors and/or can be performed for a single vendor. In scenarios that identify multiple vendors and maintain multiple lists, each respective list item in each respective list can be analyzed to identify a respective vendor assignment for each respective list item. In turn, at 1110, one or more implementations generate a list associated with the vendor that includes each respective identified list item. If a list includes list items that are not assigned to any vendor, the unassigned list items are excluded from the vendor-based lists. Thus, the vendor-based lists can include a portion or all of the list items included in the multiple lists.

Having described various aspects of list management, consider now a discussion of list collaboration in accordance with one or more implementations.

List Collaboration

Figure 12:
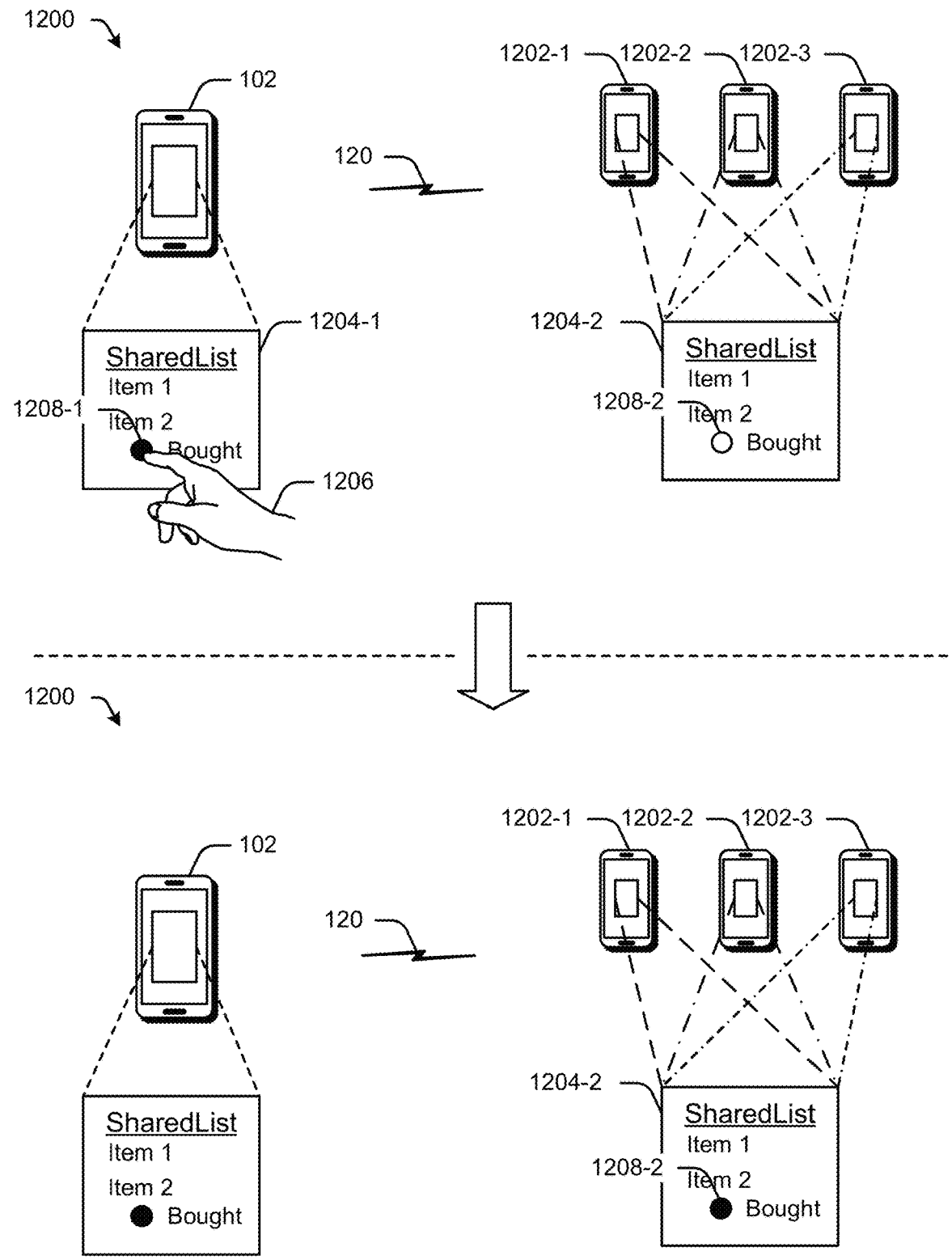
FIG. 12 illustrates an example of propagating list information in a list manager shared group in accordance with one or more implementations.

In various embodiments, a list manager provides users with a collaborative experience. This can include collaborative efforts over a network with a list manager group, users external to the list manager, vendors, and so forth. As one example, users can collaborate on a shared list (e.g., edit, change, share, and/or update lists/list items), where edits, changes, updates, etc. made by one user can be propagated to other users. To demonstrate, consider now FIG. 12 that illustrates an example environment 1200 in accordance with one or more implementations. In various scenarios, FIG. 12 represents a continuation of one or more examples described with respect to FIGS. 1-11. Further, FIG. 12 illustrates an example progression of events over an arbitrary time period, where the progression begins in the upper portion of FIG. 12 and then moves to the lower portion of FIG. 12.

Environment 1200 includes computing device 102 of FIG. 1, as well as computing device 1202-1, computing device 1202-2, and computing device 1202-3. While each computing device is illustrated here as a mobile phone, other implementations can include computing devices of varying types, such as a desktop computer, a laptop, a tablet, a smart watch, a gaming device, smart glasses, and so forth. Thus, computing device 102 and computing devices 1202-1 through 1202-3 each represent a device capable of implementing the various techniques described herein. For example, each computing device can include a respective instance of list manager module 104 of FIG. 1 and/or include a web browser that provides access to web-based list management services.

In environment 1200, computing device 102 and computing devices 1202-1 through 1202-3 belong to a list manager shared group. Accordingly, list modifications made by a group member at a first device associated with the list manager shared group can propagate to other members, user profiles, and/or associated devices of the group. To further illustrate, consider now the upper portion of FIG. 12 in which computing device 102 displays a shared list 1204-1 that represents a list maintained by a list manager as further described herein. Assume also that shared list 1204-1 has been shared and/or exists within the context of the list manager shared group associated with the computing devices within FIG. 12. Since shared list 1204-1 resides within the context of the list manager shared group, each of computing devices 1202-1 through 1202-3 has respective access to the content associated with shared list 1204-2, generally represented here as shared list 1204-2. For simplicity's sake, shared list 1204-2 is illustrated here as a single list, but it is to be appreciated that each device of computing devices 1202-1 through 1202 3 can maintain a respective instance and/or copy of shared list 1204-2 without departing from the scope of the claimed subject matter.

Now consider a scenario in which user 1206 updates the content within shared list 1204-1 using computing device 102. For example, in the upper portion of FIG. 12, user 1206 changes the state of a list item from a pending state to a bought state by actuating selectable control 1208-1. Prior to the actuation of control 1208-1, the associated list item, as viewed by the list manager, has a pending/unpurchased state. Thus, prior to synchronizing the state change made at computing device 102, the selectable control 1208-2 in each respective shared list 1204-2 of the list manager shared group indicates a pending/unpurchased state of the respective list item.

Responsive to a change in list content, various implementations propagate the list content changes to other members, user profiles, and/or associated devices included in a list manager shared group. In the context of FIG. 12, list content changes made at computing device 102 (e.g., the state change of selectable control 1108-1) are propagated to computing devices 1202-1 through 1202-3. While FIG. 12 illustrates the propagation of state information, other types of list content can be propagated as well, such as the entry or deletion of a list item, a title change to a particular list, the creation of a new list, pricing information associated with list items, and so forth.

Moving to the lower portion of FIG. 12, the state change of selectable control 1208-1 made via shared list 1204-1 is propagated to the other devices within the list manager shared group. Here, the list manager propagates the state change information over communication cloud 120 of FIG. 1 from computing device 102 to computing devices 1202-1 through 1202-3, but the propagation can alternately or additionally include servers 122 (not illustrated here). To indicate the updated list content, selectable control 1208-2 of shared list 1204-2 visibly changes from a hollow circle to a solid circle. In various implementations, the state change information can be propagated throughout the shared group independent of whether each member, user profile, and/or associated device of the list manager shared group is actively viewing the corresponding list. For example, if a particular computing device within the list manager shared group is not actively viewing the shared list at a point in time in which the originating device propagates list information, various implementations allow for the particular computing device to access the updated list information at a later point in time Thus, the originating device can propagate updated list information to servers 122, which then provides the updated list information when the particular computing device next accesses and/or communicates with servers 122.

FIG. 12 illustrates an example of automatically sharing list content across a list manager shared group in accordance with one or more implementations. As a user updates list information, such as indicating a list item has been purchased, various implementations propagate the updated information automatically to the other devices without any additional input from the user. In other words, the user does not activate a particular control dedicated to sharing content. Instead, the list manager identifies when changes have been made to a list, identifies what the changes are, and automatically propagates the changes to other devices within the list manager shared group. However, other implementations alternately or additionally provide the user with the ability to manually share list information to devices internal and/or external to the list manager.

Figure 13A:
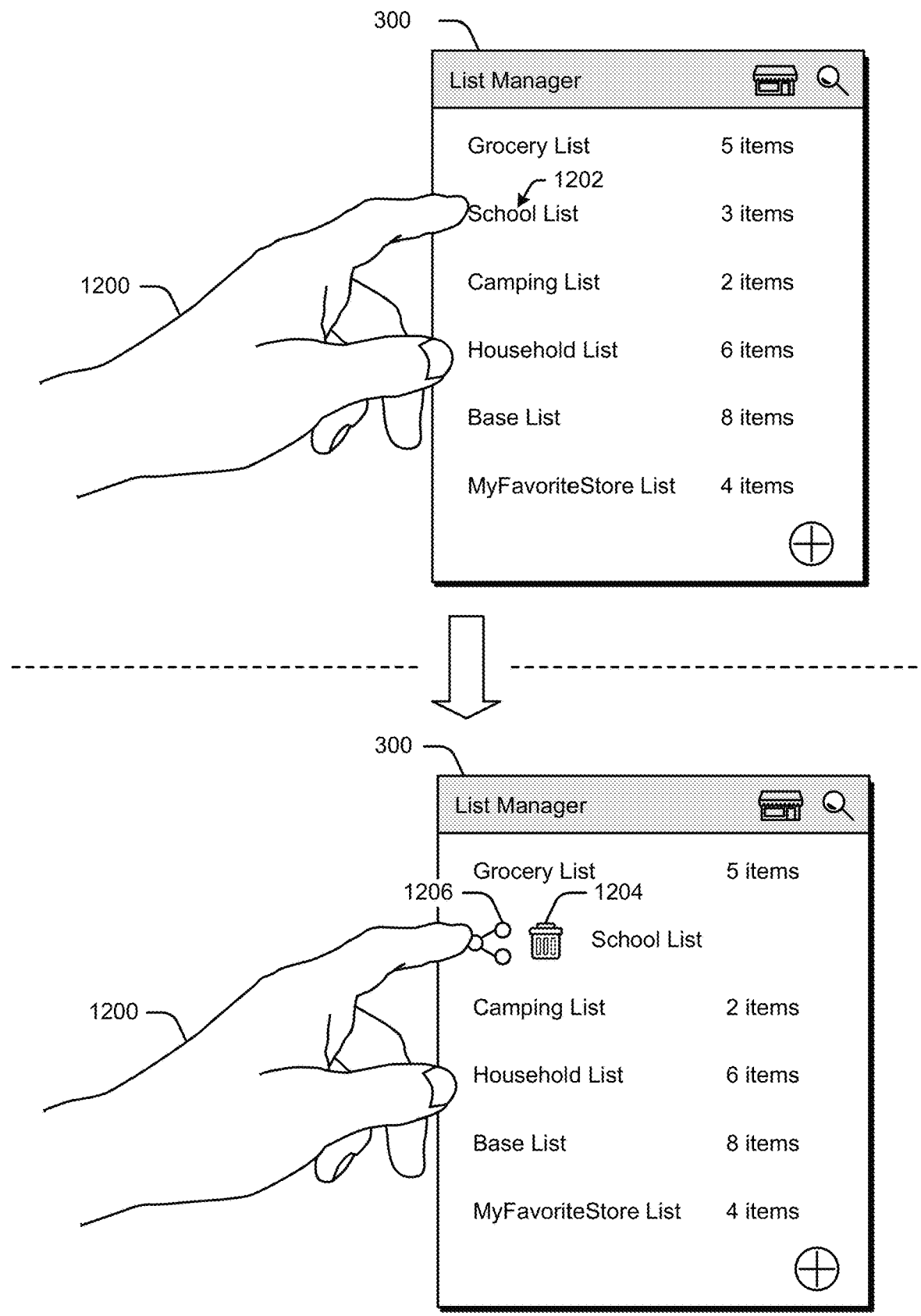
FIGS. 13*a* and 13*b* illustrate an example of sharing list information in accordance with one or more implementations.
Figure 13B:
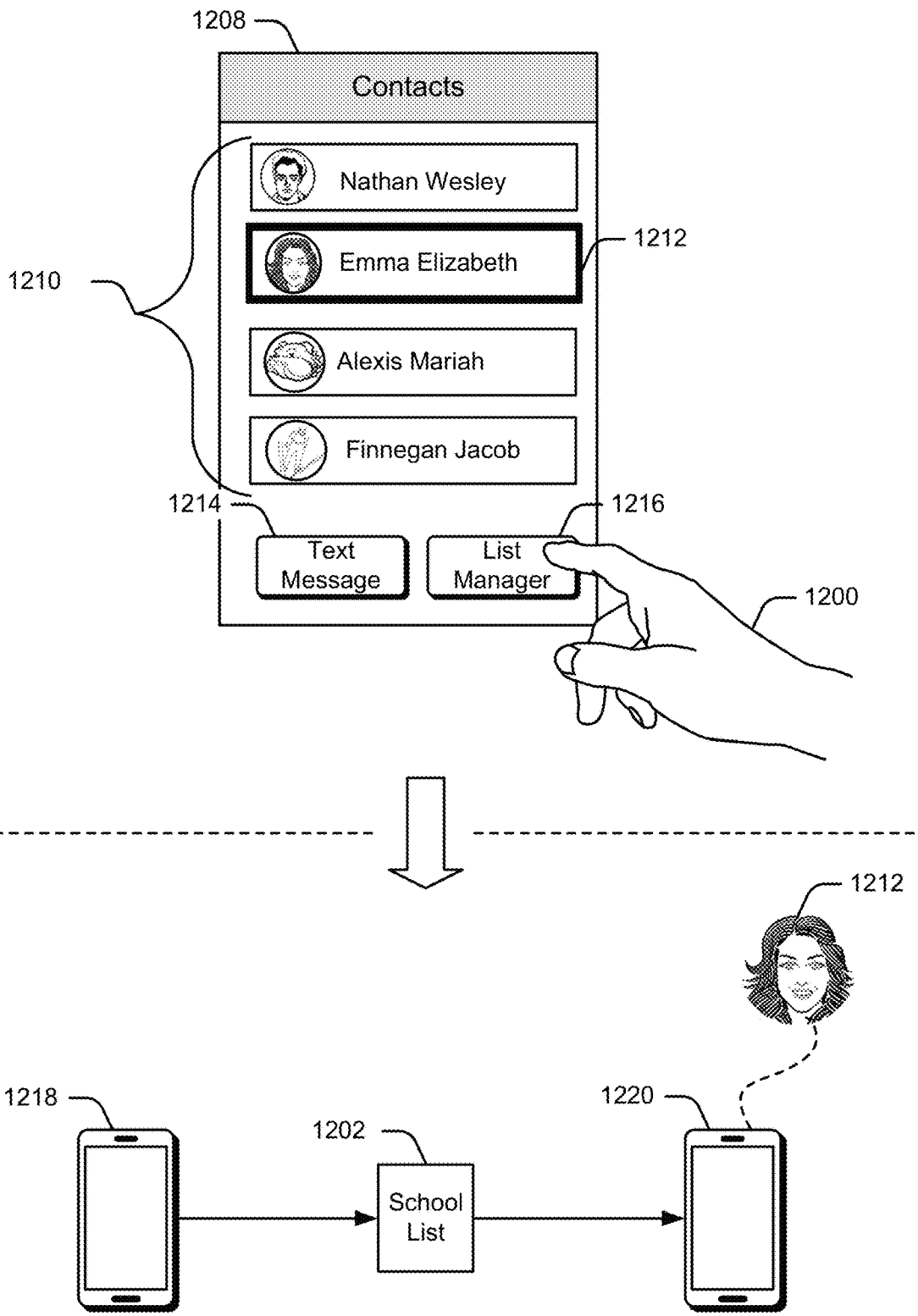

To further demonstrate, consider now FIG. 13*a* and FIG. 13*b* that illustrate an example of sharing list information in accordance with one or more implementations. In various scenarios, the example described with respect to FIGS. 13*a* and 13*b* can be considered a continuation of one or more examples described with respect to FIGS. 1-12. Collectively, FIGS. 13*a*-13*b* illustrate an example progression of events over an arbitrary time period. In this example, the progression begins in the upper portion of FIG. 13*a* and then moves to the lower portion of FIG. 13*a*. The progression then proceeds to the upper portion of FIG. 13*b*, followed by the lower portion of FIG. 13*b*. It is to be appreciated that the progression of events described with respect to FIGS. 13*a* and 13*b* are for discussion purposes, and that any other ordering, omission, and/or addition to the events can occur without departing from the scope of the claimed subject matter.

The upper portion of FIG. 13*a* includes user interface 300 of FIG. 3 that displays a collection of lists. Here, user 1300 selects list 1302 through a touch-gesture input. However, other types of input can be used to initiate a selection, examples of which are provided herein. Moving to the lower portion of FIG. 13*a*, and in response to the selection of list 1302, user interface 300 displays controls that correspond to actions that can be applied to list 1302: delete control 1304 and share control 1306. Delete control 1304 provides the ability to remove and/or delete list 1302, while share control 1306 provides the ability to share portions or all of the list information associated with list 1302. Here, user 1300 actuates share control 1306 via a touch-gesture input to share list information with other users and/or devices.

In response to the actuation of share control 1306, the process proceeds to the upper portion of FIG. 13*b* where the list manager displays user interface 1308. User interface 1308 includes multiple contacts, generally indicated here as contacts 1310. Contacts 1310 represent any suitable address and/or user profile that can be selected to receive list information, such as list manager user profiles, users included in a list manager shared group, a telephone number, an email address, etc. For example, some implementations determine what contacts are included in contacts 1310 by accessing an address book associated with the device displaying user interface 1308, such as an address book that external to a list manager, an address book internal to the list manager, etc. Alternately or additionally, various implementations identify user profiles of members included a list manager shared group associated with the selected list (e.g., list 1302) to present as contacts 1310. The addressable information included in the contact information represents routing information to a recipient, such as an e-mail address, a cellular phone number, a land line telephone number, a list manager user profile, and so forth. Here, user 1300 has selected contact 1312 as an intended recipient of the selected list. Accordingly, contact 1312 is in a selected stated, while the other contacts are in an unselected state. User interface 1308 further denotes this by visually altering the appearance of contact 1312 relative to the other contacts. While the example described with respect to FIG. 13*b* illustrates a single contact being in a selected state, other implementations support multiple contacts being in a selected state at a same time.

User interface 1308 also includes text message share control 1314 and list manager share control 1316. Text message share control 1314 represents functionality that propagates a list and/or list information to a recipient device over a Short Message Service (SMS) infrastructure. For example, the list manager can interface with text messaging capabilities provided by a corresponding computing device to transmit the selected list to the selected contact. List manager share control 1316 represents functionality that propagates a list and/or list information to a recipient device within the context of the list manager. For example, the list manager can provide a communication mechanism that communicates across to various instances of list manager applications using communication cloud 120 and/or servers 122 of FIG. 1 (not illustrated here). Whether shared via text message share control 1314 or list manager share control 1316, the propagation of a list and/or list information can include transmitting any suitable type of list information to the selected contact, such as UPC code information, pricing information, state information, the list items, and so forth. Thus, any amount of list content can be transmitted to another user and/or device, including contacts included in a list manager shared group and contacts external to a list manager shared group.

Various implementations alter the amount of list information propagated based upon whether the recipient is associated with a list manager, or is external to a list manager. For example, if the recipient has a respective instance of a list manager installed on a corresponding device, or is a member of a list manager shared group, various implementations propagate supplemental information associated with a shared list that is in a proprietary format internal to the list manager. As another example, if the recipient is external to the list manager shared group and/or does not have access to list manager services, various implementations reduce the amount of list information propagated. For instance, the propagated information may include list items without supplemental list information. In the upper portion of FIG. 13*b*, contact 1312 represents a contact that is included in a list manager shared group. Accordingly, user 1300 actuates list manager share control 1316.

Moving to the lower portion of FIG. 13*b*, and in response to the actuation of list manager share control 1316, various implementations share portions or all of list 1302 using the various services provided by the list manager. For example, assume here that computing device 1318 displays user interface 1308 and receives the user input actuating list manager share control 1316. In response to this input, computing device 1318 forwards list 1302 to recipient device 1320 using information obtained from contact 1312. In other words, recipient device 1320 represents a destination address identifiable and/or associated with contact 1312. While the example described with respect to FIGS. 13*a* and 13*b* discusses sharing list content, other types of actions can be applied in a similar manner, such as assigning a list and/or list items to another user.

Figure 14:
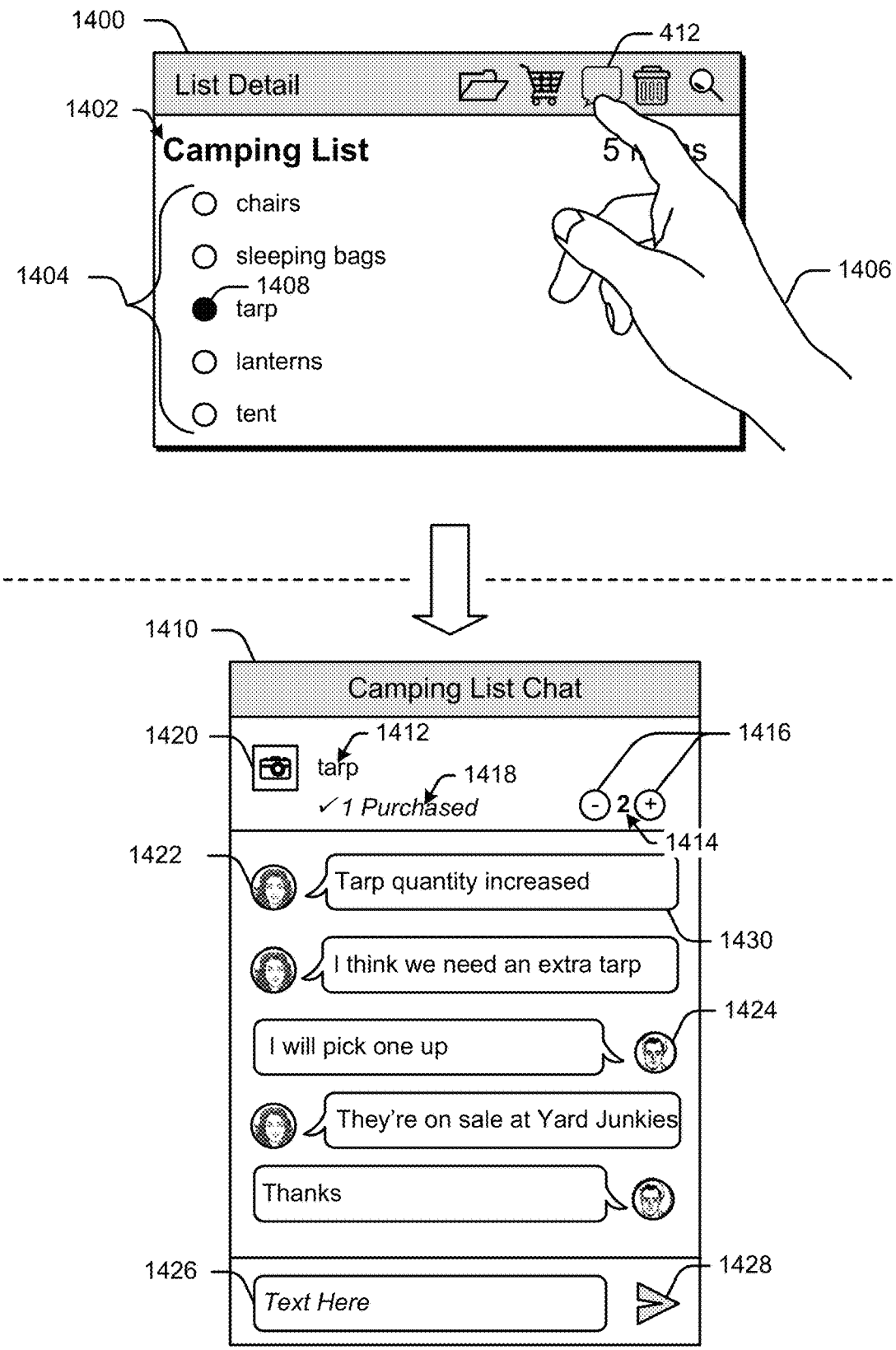
FIG. 14 illustrates an example of invoking a communication session in the context of a list item in accordance with one or more implementations.

Various implementations provide other forms of collaboration between list managers as well. To further demonstrate, consider now FIG. 14 that illustrates an example of communication exchanges in the context of a list item that is in accordance with one or more implementations. In various scenarios, the example described with respect to FIG. 14 can be considered a continuation of one or more examples described with respect to FIGS. 1-13*b*. FIG. 14 illustrates an example progression of events over an arbitrary time period, where the progression begins in the upper portion of FIG. 14 and then moves to the lower portion of FIG. 14. It is to be appreciated that the progression of events described with respect to FIG. 14 are for discussion purposes, and that any other ordering, omission, and/or addition to the events can occur without departing from the scope of the claimed subject matter.

The upper portion of FIG. 14 includes user interface 1400 that displays various details associated with the list associated with list identifier 1402. More particularly, user interface 1400 displays a collection of list items 1404 that are associated with the list. Here, user 1406 has selected a particular list item by enabling selectable control 1408. User interface 1400 also includes communication control 412 that provides the user with an ability to initiate a communication exchange in the context of the selected list item associated with selectable control 1408. Accordingly, and in response to user 1406 actuating communication control 412, various implementations establish a communication session with one or more other instances of list managers. The selection of who to establish a communication session with can be achieved in any suitable manner. For example, some implementations display a contacts list similar to that described with respect to user interface 1308 of FIG. 13*b* that enables user 1406 to select one or multiple users.

Moving to the lower portion of FIG. 14, various implementations establish a communication session with another user, further illustrated here in user interface 1410 as an instant messaging communication session with another list manager. However, it is to be appreciated that any other type of communication session can be established, such as a real-time voice communication session, a real-time video communication session, a text messaging communication session, and so forth. Various implementations perform the communication session in the context of the selected item (e.g., list item 1412). Accordingly, user interface 1410 includes information associated with the selected list item, such as a quantity number 1414 that includes controls 1416 to increase or decrease the associated quantity value. In one or more implementations, quantity number 1414 reflects a value that is propagated within the context of the communication session such that changes made in user interface 1410 are propagated to other interfaces associated with the communication session. Alternately or additionally, quantity number 1414 reflects a value that is propagated throughout a list manager shared group associated with the corresponding list as further described herein. For example, if user 1406 increases or decreases the quantity number through the corresponding controls, the newly generated quantity number can be propagated to other members within the list manager shared group. Similarly, as other users increase or decrease a quantity number, this change is reflected in quantity number 1414.

User interface 1410 also includes purchase information 1418 that provides purchase state information, and image icon 1420 to provide images associated with the selected item. Similar to quantity number 1414, purchase information 1418 reflects shared information in the context of a list manager shared group such that updates to the purchase state at one instance of a list manager can be propagated to other list managers as further described herein. In various implementations, image icon 1420 operates as a selectable control that, when selected, provides a mechanism to upload one or more images.

Consider a scenario in which the user initiating the communication session desires a particular brand associated with the selected list item. By activating image icon 1420, the user can upload an image of the selected list item in the particular brand's packaging. In turn, the list manager can store the uploaded image as supplemental information for the corresponding list item and/or propagate the uploaded image to other users in the list manager shared group. Similarly, various members within the list manager shared group can upload images by a respective image icon on a respective instance of the list manager, which is then stored as supplemental information and/or populates image icon 1420 in user interface 1410.

The instant messaging communication session displayed in user interface 1410 includes a real-time exchange of messages between user 1422 and user 1424, where the users can be in a same list manager shared group and/or have access to respective instances of list managers. To exchange messages, user interface 1410 includes text field 1426 that receives text input at user interface 1410. In turn, when control 1428 is actuated, the received text input is transmitted to other users included in the communication session. While a user can enter text input for transmission in a communication session, various implementations can alternately or additionally transmit automatically generated messages.

Consider message 1430 that indicates "Tarp quantity increased". Instead of a user-defined text message that is entered in text field 1426 and transmitted via the actuation of control 1428, the list manager automatically generates and sends the message in response to the increase control of controls 1416 being actuated. In other words, the list manager identifies a change in the list item quantity and determines to automatically send a notification to members of the communication session. The list manager can alternately or additionally propagate the list change across a list manager shared group as further described herein.

Figure 15:
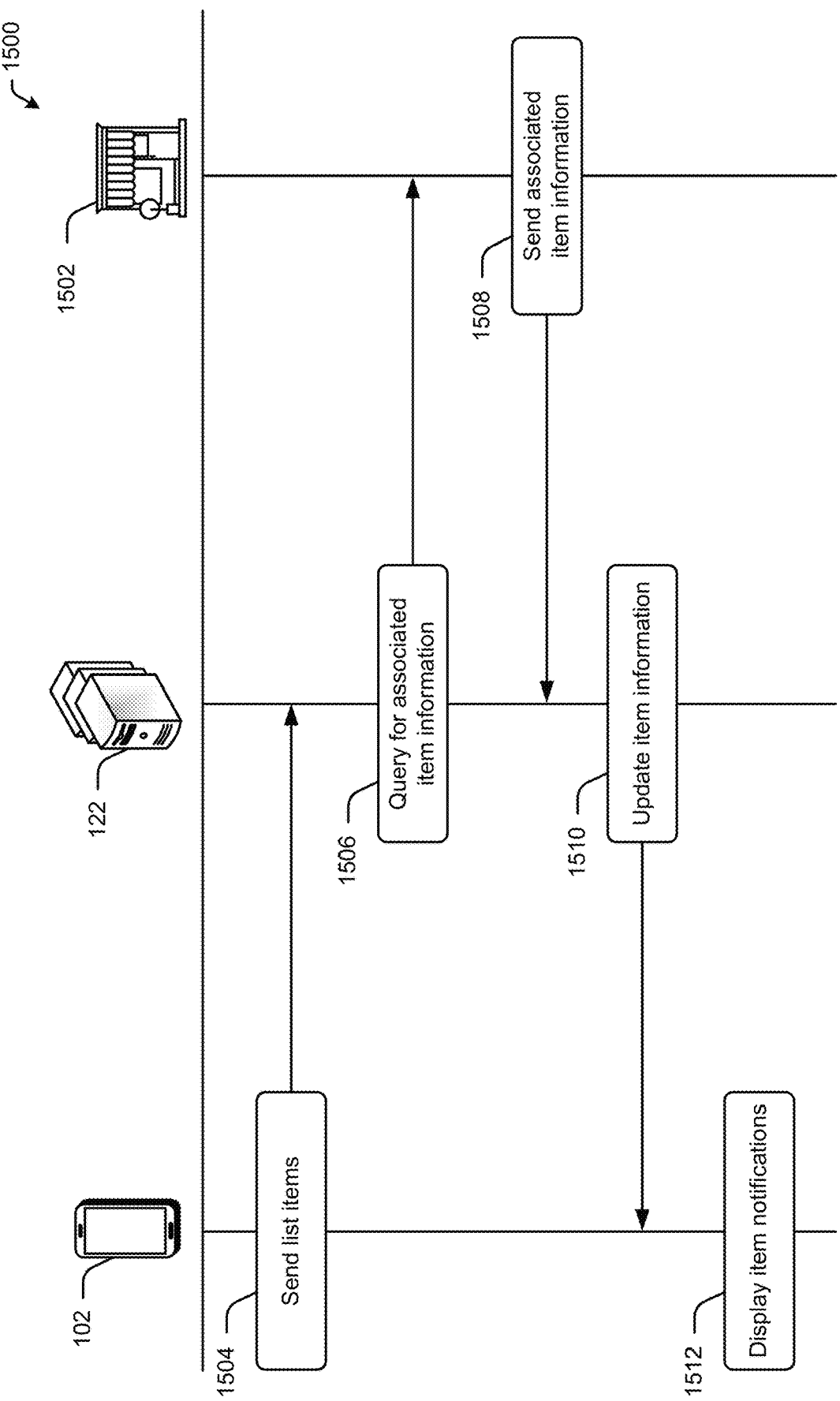
FIG. 15 illustrates various interactions between devices to acquire supplemental list item information from vendors in accordance with one or more implementations.

A list manager can enable collaboration with other entities as well, such as vendors. For example, various implementations collaborate with vendors to determine pricing information as further described herein. Alternately or additionally, some implementations collaborate with vendors to identify coupons, sales, and/or price changes, and subsequently provide notifications of these events to the user. To demonstrate, consider now FIG. 15 that includes an example process 1500 that illustrates example communication exchanges between devices in accordance with one or more embodiments. In various implementations, FIG. 15 represents a continuation of one or more examples described with respect to FIGS. 1-14. FIG. 15 includes computing device 102 and servers 122 of FIG. 1 as well as vendor 1502. The respective vertical lines underneath each device corresponds to actions performed at that device. Thus, the vertical line beneath computing device 102 corresponds to actions performed by the computing device 102, the vertical line beneath servers 122 corresponds to actions performed by servers in the system, and the vertical line beneath vendor 1502 corresponds to actions performed by a device associated with vendor 1502, such as a vendor server device and/or desktop computing device. The horizontal action lines between the different devices represent communications across a network between the connected devices, such as through transmitting and receiving messages and/or the invocation of software functionality across devices using cloud-based services. While the communication exchanges described in FIG. 15 illustrate these exchanges in a particular order, it is to be appreciated that any specific order or hierarchy of the communication exchanges described here is used to illustrate an example of a sample approach. Other approaches may be used that rearrange the ordering of these steps. Thus, the steps described here may be rearranged, and the illustrated ordering of these steps is not intended to be limiting.

At 1504, computing device 102 sends one or more list items to servers 122. For example, as a new list item is added to a list, the new list item can be forwarded to the server automatically. Alternately or additionally, computing device 102 can automatically send all of the list items included in a particular list when the list is accessed. In various implementations, the user manually selects one or more list items and send copies of the list items from computing device 102 to servers 122. For instance, some implementations provide a drop-down menu and/or selectable control that the user manually actuates. Sending the list item can alternately or additionally include supplemental information, such as user preferences, context information, images, and so forth. In some scenarios, the computing device 102 can request specific item information about the associated list items, such as requesting coupon availability, promotional codes, pricing information, sale information, and so forth. Accordingly, in various implementations, sending the list items can include sending a query or request for list information, such as a query for coupon information, a query for pricing information, a query for vendors, and so forth, and including the list items within the query. While is illustrated as a single step, it is to be appreciated that alternate or additional implementations utilize multiple messages, including bi-directional messages between computing device 102 and servers 122 and/or the invocation of software over the network using cloud-based services Upon receiving the list items, various implementations query vendors for the associated item information at 1506. For example, servers 122 can query user-preferred vendors for coupon information associated with the list items. As another example, servers 122 can query vendors within a predetermined location for pricing information associated with the list items. Various implementations obtain and send UPC code information with the queries. While is illustrated as a single step, it is to be appreciated that various implantations utilize multiple messages, including bi-directional messages between servers 122 and vendor 1502 and/or the invocation of software over the network using cloud-based services. Further, it is to be appreciated that querying a vendor can include send multiple queries to multiple vendors, where each respective query is sent to a respective vendor. Various implementations automatically query vendors for information in response to receiving list items, while other implementations initiate the query based upon identifying a query and/or request command included with the list of items.

In response to the query at 1506, vendor 1502 sends associated information to servers 122 at 1508. While illustrated here as a single vendor, it is to be appreciated that multiple vendors can send associated item information without departing from the scope of the claimed subject matter. The associated item information can include promotional and/or discount coupon codes, pricing information, differential pricing information (e.g., incremental or decremented change from last update), dates associated with how long the coupon codes are valid, and so forth. As further described herein, sending the associated item information can include multiple messages, including bi-directional messages between vendor 1502 and servers 122 and/or the invocation of software over the network using cloud-based services.

Servers 122 update item information at 1510. To demonstrate, consider a scenario in which servers 122 receive multiple prices for a particular list item from different vendors. Upon receiving the multiple prices, various implementations can prioritize and/or sort the pricing information according to one or more parameters (e.g., lowest price too high, highest price too low, geographical location closest to furthest, and so forth). This can also include comparing the associated item information sent at 1508 with previously received item information to identify any changes, and update the item information based upon any identified changes. Here, updating the item information includes updating the list item information at computing device 102. Various implementations update multiple computing devices with the item information based upon list manager shared group settings and/or by identifying which devices are subscribed to receive information about the list item associated with the item information. Upon receiving the updated item information, computing device 102 optionally displays item notifications corresponding to the updated item information at 1512.

Figure 16:
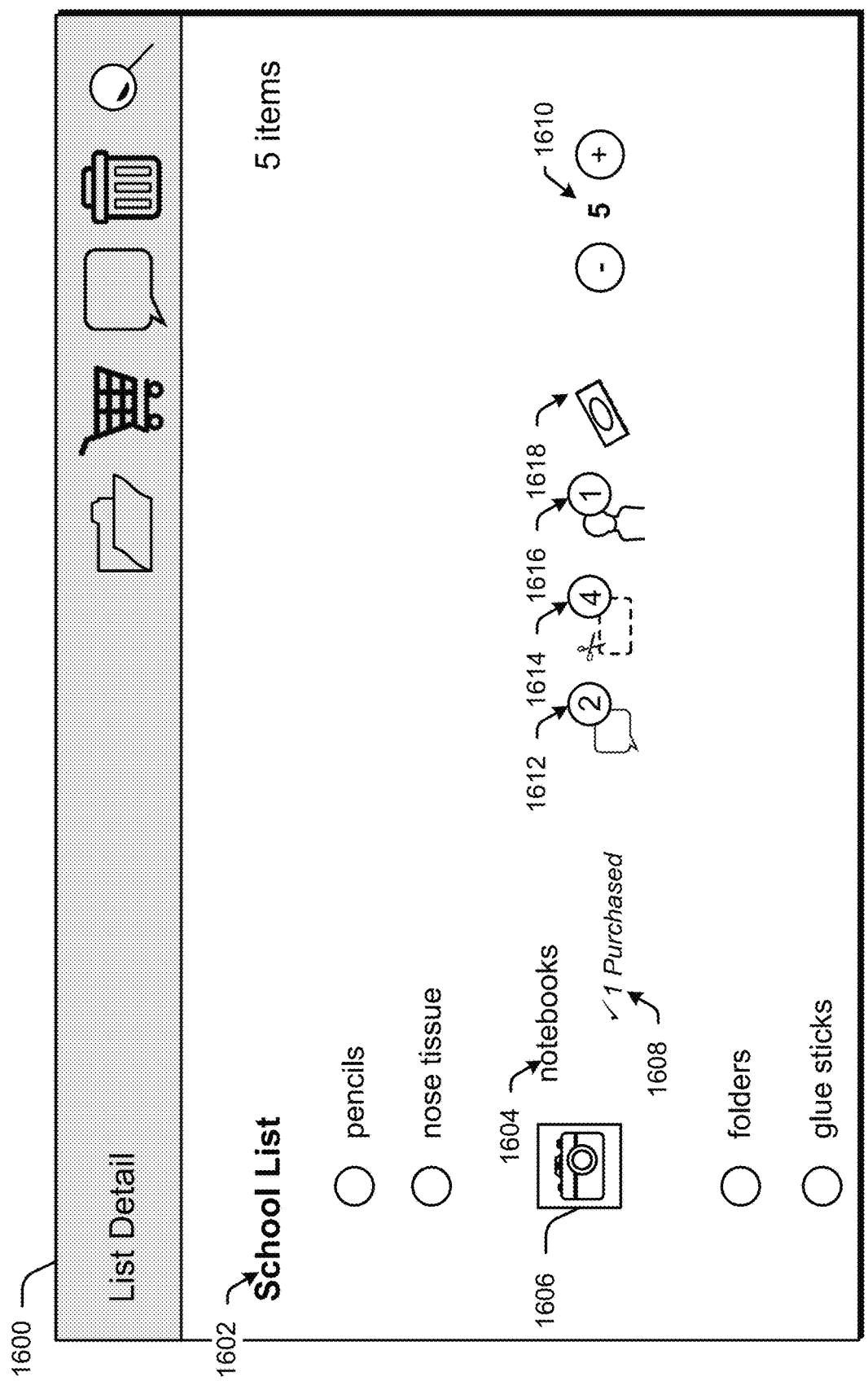
FIG. 16 illustrates an example user interface that displays various list notifications in accordance with one or more implementations.

Consider now FIG. 16 that illustrates an example user interface 1600 in which various list manager notifications are displayed in accordance with one or more implementations. In various implementations, FIG. 16 represents a continuation of one or more examples described with respect to FIGS. 1-15. Here, user interface 1600 displays details corresponding to a list corresponding to list identifier 1602, where the list includes five items. Here, list item 1604 has been expanded to expose additional information, such as through a touch-gesture input that selects and expands the item information similar to that described with respect to FIG. 12a. Upon expansion, list item 1604 displays image icon 1606, purchase information 1608, and quantity information 1610 to provide image information, purchase state information, and quantity information associated with the list item as further described herein. However, the user interface displays additional item notifications as well.

Communication notification 1612 displays a notification of a pending communication exchange that has not yet been consumed. For instance, referring back to the discussion of an instant messaging communication session in the context of a list item, communication notification 1612 includes an indication that two messages have been received in an instant messaging communication session associated with list item 1604 that have not yet been read. Thus, various implementations provide a notification of pending incoming and/or outgoing communication exchanges with other list managers. If no communication exists and/or there are no unconsumed communications associated with list item 1604, various implementations omit the display of communication notification 1612.

Coupon notification 1614 displays a notification of available coupons associated with list item 1604. For example, some implementations automatically acquire coupon information in response to the expansion of list item 1604, such as through the example described with respect to FIG. 15. Alternately or additionally, coupon information can be acquired during periods of time when the user is not interacting with the list manager so that information can be collected prior to the expansion of list item 1604. As yet another example, the coupon information can be newly acquired each time the list is accessed. In this example, coupon notification 1614 indicates that there are four different coupons associated with list item 1604. To illustrate, consider an example in which servers 122 of FIG. 15 receive coupon information from multiple vendors and forward the information to the computing device displaying user interface 1600. Since there are multiple coupons available, user interface 1600 includes an indication of the multiple coupons in coupon notification 1614. Further, some implementations provide access to the different coupons through the selection and/or actuation of coupon notification 1614 such that a user can discern what coupons are available at which vendor. Alternately or additionally, a coupon can be automatically applied by the list manager during an online transaction, such as by entering a promotional code into a corresponding field as further described herein. If no coupons have been identified for list item 1604, various implementations omit the display of coupon notification 1614.

Assignment notification 1616 indicates whether list item 1604 has been assigned to another person. For example, in some implementations, if the list item has not been assigned to anyone, assignment notification 1616 can be omitted from of the display and/or indicate that zero assignments exist. Here, assignment notification 1616 indicates that one assignment of list item 1604 exists. For example, in response to selecting a list item, some implementations display a list of contacts similar to that described with respect to FIG. 13b, where the corresponding user interface includes an assignment control that assigns the respective list item to one or more selected contacts. In turn, not only does user interface 1600 display an indication of this assignment, but various implementations provide access to assignment information through the selection and/or actuation of assignment notification 1616. Alternately or additionally, if no assignment for list item 1604 has been made, various implementations omit the display of assignment notification 1616.

Price notification 1618 indicates that pricing information associated with list item 1604 is available. The pricing information can be acquired in any suitable manner, such as through the process described with respect to FIG. 15. While not illustrated in user interface 1600, various implementations display a numeric notification when a multiple instances of pricing information have been acquired. Alternately or additionally, if no pricing information has been obtained, various implementations omit the display of price notification 1618.

Figure 17:
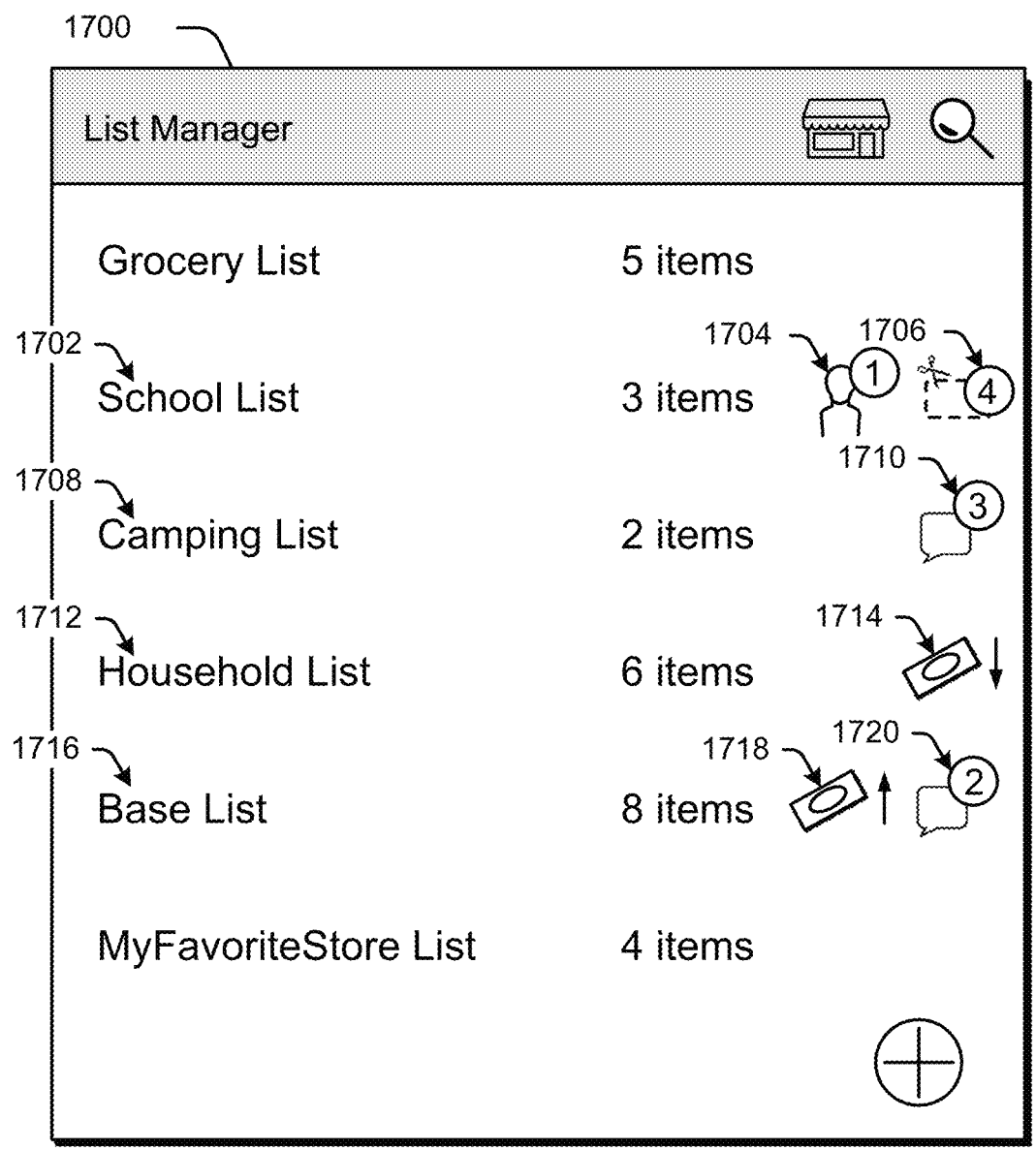
FIG. 17 illustrates an example user interface that displays various list notifications in accordance with one or more implementations.

While FIG. 16 illustrates various collaborative notifications in the context of a detailed list user interface, the notifications can be displayed on other types of user interfaces as well. To demonstrate, consider now FIG. 17 that illustrates an example user interface 1700 in accordance with one or more implementations. In various implementations, FIG. 17 represents a continuation of one or more examples described with respect to FIGS. 1-16.

Similar to user interface 300 of FIG. 3, user interface 1700 displays a collection of lists. In this example, each respective list has one or more respective notifications that indicate various states associated with the list. To demonstrate, list 1702 has an associated assignment notification 1704 that indicates the list has been assigned to one person, and an associated coupon notification 1706 that indicates there are four coupons available for various list items. Here, user interface 1700 visually illustrates the association of assignment notification 1704 and coupon notification 1706 to list 1702 by placing the notifications on the same horizontal line. As another example, list 1708 has an associated communication notification 1710 that indicates a communication session exists for the list, and that the communication has three unconsumed communications. In various implementations, the display and/or omission of a notification icon visually indicates state information associated with the respective list. Thus, the omission of a communication notification for list 1702 indicates that no communication session for that list has been established. Similarly, the omission of an assignment notification and coupon notification for list 1708 indicates that there are no existing assignments or identified coupons for the associated list. Moving downward, list 1712 has an associated price notification 1714 that indicates a price drop for a list item has been identified through the use of a downward pointing arrow. Similarly, list 1716 includes a price notification 1718, but this notification indicates a price increase for a list item has been identified through the use of an upward pointing arrow. List 1716 also has an associated communication notification 1720 that indicates two unconsumed communications exist for an established communication session associated with list 1716. Accordingly, various lists can be in various states of collaboration with vendors, devices, and so forth, which are then visually conveyed by user interface 1700 through the display and/or omission of notification icons as further described herein.

Figure 18A:
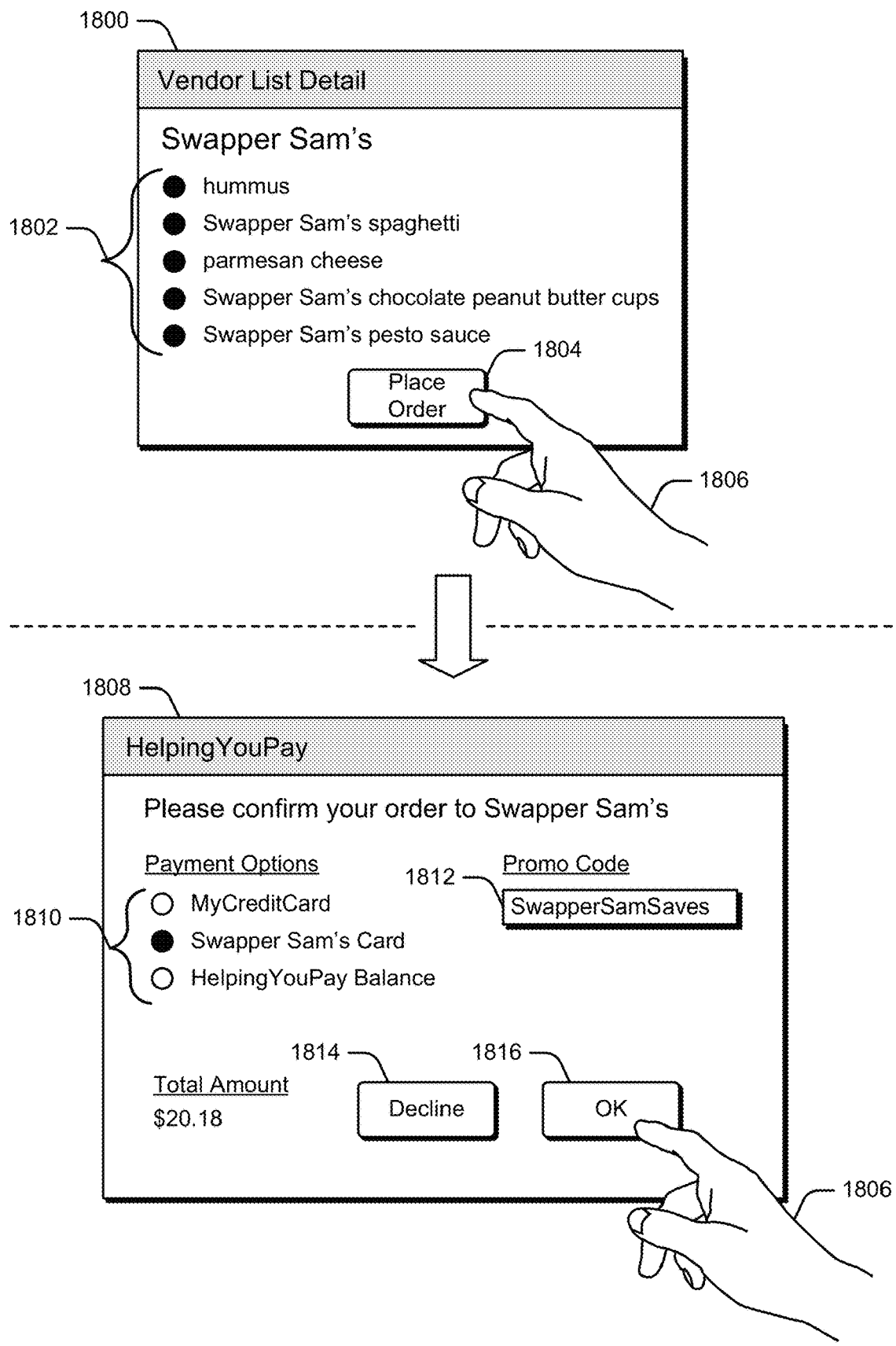
FIGS. 18*a* and 18*b* illustrate an example of purchasing list items using third-party services in accordance with one or more implementations.
Figure 18B:
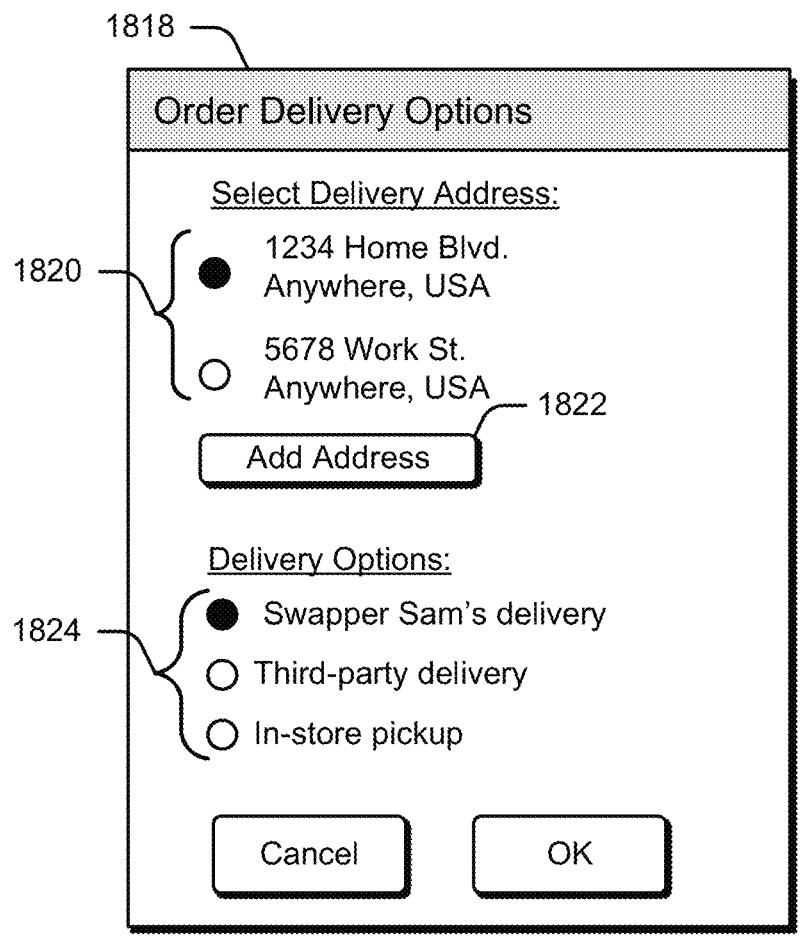

While various implementations collaborate with vendors to acquire supplemental information associated with a list, alternate or additional implementations collaborate with third-party service providers. To further demonstrate, consider now FIGS. 18*a* and 18*b* that illustrate an example of a list manager interfacing with a third-party service provider in accordance with one or more implementations. In various implementations, FIGS. 18*a* and 18*b* represent a continuation of one or more examples described with respect to FIGS. 1-17. Collectively, FIGS. 18*a*-18*b* illustrate an example progression of events over an arbitrary time period. Here, the progression begins in the upper portion of FIG. 18*a* and then moves to the lower portion of FIG. 18*a*. The progression then proceeds FIG. 18*b*. It is to be appreciated that the progression of events described with respect to FIGS. 18*a*-18*b* are for discussion purposes, and that any other ordering, omission, and/or addition to the events can occur without departing from the scope of the claimed subject matter.

The upper portion of FIG. 18*a* includes user interface 1800 that is representative of a vendor-based list, such as the vendor-based lists described with respect to FIGS. 6 and 7. Here, user interface 1800 generally includes list items 1802 that that have been assigned to a particular vendor. Each respective item included in list items 1802 is in a selected state, which is further indicated by each respective selectable control being a solid circle. User interface 1800 also includes order control 1804 that, when actuated, initiates an order transaction for the selected list items with a corresponding vendor over a communication network. Since each list item included in list items 1802 is in a selected state, the order transactions includes a request to purchase each list item. While the example here is described in the context of a vendor-based list, various implementations alternately or additionally provide the ability to initiate an order transaction for list items included in other types of lists. For example, a user interface associated with a user-generated list can include an order control that enables a user to not only initiate the purchase of portions or all of the list items, but additionally select a particular vendor, payment method, delivery option, etc. Here, user 1806 actuates order control 1804 through the use of a touch-gesture.

Moving to the lower portion of FIG. 18*a*, and in response to the actuation of order control 1804, various implementations collaborate with a third-party payment service to provide payment options for the pending order. Here, user interface 1808 renders a user interface associated with a third-party payment service entitled "HelpingYouPay". More particularly, the list manager can facilitate the various message transactions and/or invocations with the third-party payment service to render user interface 1808 without additional input from the user. Generally, a third-party payment service provides the ability to obscure payment and/or other sensitive information associated with a user from vendors or other online entities. For example, a user creates a user profile with the third-party service (e.g., "HelpingYouPay"), and adds payment and/or user information to the profile, such as financial information, banking information, credit card information, debit card information, gift card information, PINs, etc. In turn, when an online vendor supports payment through the third-party payment service, the user can access the third-party payment service to transfer payment to the online vendor without exposing sensitive user information directly to the vendor. Accordingly, various implementations provide access to third-party payment services to provide payment services for order transactions. Alternately or additionally, various implementations provide direct access to an online vendor's payment mechanism without involving a third-party payment service. In other words, instead of rendering user interface 1808 that provides access to the third-party payment service, various implementation render a user interface associated with the vendor's online payment mechanism.

In FIG. 18*a*, user interface 1808 provides access to a third-party payment service, where the third-party payment service supports multiple payment options. Accordingly, user interface 1808 generally includes payment options 1810, where each payment option has a respective selectable control that can be used to select a particular payment option as further described herein. Since the payment option "Swapper Sam's Card" is in a selected state, various implementations direct the third-party payment service to use this payment mechanism.

User interface 1808 also includes optional text field 1812 that receives input corresponding to a coupon and/or promotional code for the vendor. Recall from other discussions that various implementations acquire coupon information as supplemental information associated with a list and/or list item. During an order transaction, the list manager can analyze supplemental information one or more of list items 1802 to determine whether coupon information has been identified for any of the list items. In response to identifying a coupon, various implementations automatically populate text field 1812, further illustrated here with the promotional code "SwapperSamSaves", but alternate or additional implementations provide the manual entry of content into text field 1812 as well.

User interface 1808 also includes decline control 1814 and confirm control 1816 that can be used to terminate or confirm an order transaction, respectively. In this example, user 1806 actuates confirm control 1816 to place an order transaction with the identified vendor through the third-party payment service. As part of an order transaction, various implementations provide delivery options to the user. Accordingly, in response to the actuation of confirm control 1816, the progression of events moves to FIG. 18*b*.

FIG. 18*b* illustrates user interface 1818 that includes various delivery options (e.g., address selection, delivery type selection). While the progression of events described here illustrate the presentation of delivery options after the confirmation an order transaction, it is to be appreciated that alternate or additional implementations provide deliver options during other stages of an order transaction. Here, user interface 1818 includes two suggested addresses 1820, where each respective address has an associated selectable control that enables selection of the address as further described herein. The suggested addresses can be identified in any suitable manner, such as through user profile information associated with the third-party payment service, default information, context information from past order transactions, address books, and so forth. User interface 1818 also includes address control 1822 that enables manual entry of an address. Accordingly, the selected address, whether a suggested address or a manually entered address, is used as the destination for delivery of the various list items included in the order transaction.

User interface 1818 also includes three delivery options 1824, each of which has a respective selectable control as further described herein. The options included in the delivery options can be determined in any suitable manner, such as through context information that indicates user-preferences on past delivery options, querying a vendor for supported delivery options, and so forth. Alternately or additionally, the delivery options can include a third-party delivery service option. For example, selection of a third-party delivery service can act as an agreement between the user and the delivery service for courier services, where the third-party delivery service obtains the purchased items from the vendor and delivers the purchased items to the selected destination address for an agreed upon fee. While not illustrated here, the list manager can facilitate the various message transactions and/or invocations with online access to the third-party delivery service to render a user interface that can be used configure various delivery parameters, such as selecting the third-party delivery service as a courier, providing delivery information, providing payment for delivery services, etc.

The collaboration of a list manager with vendors, service providers, and other devices helps provide the user with relevant list information that might otherwise go unnoticed. The collaboration also provides the user with a mechanism to convey relevant list information to other users. For example, upon identifying a sale price or coupon availability for a list item included in one of the user's lists, the list manager can notify the user of the price savings opportunities in a timely manner while the price savings are valid. In turn, the user can initiate communications with another user in the context of the list item to convey the price savings opportunities. However, the collaboration also helps the vendors and service providers promote their respective commodities to relevant users. For example, if a user has interest in a particular list item, the list manager can query each vendor for pricing information and/or availability of that list item. This grants the vendor an opportunity to compete with other vendors for the sale of a list item that is known to be of interest.

Figure 19:
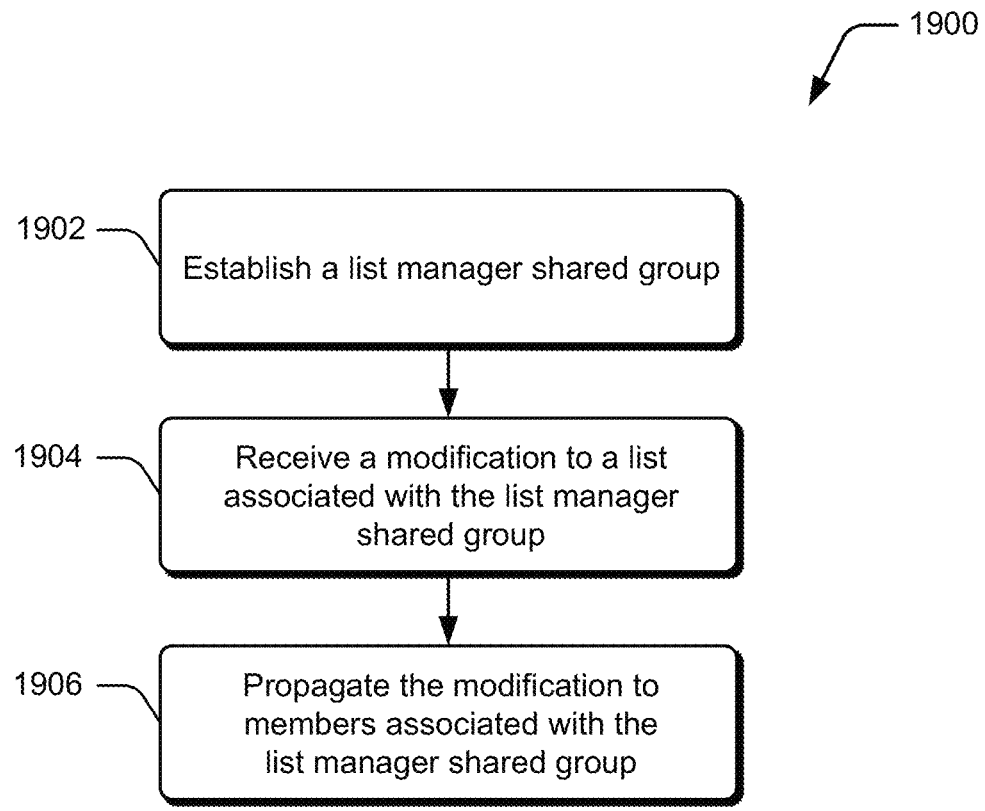
FIG. 19 illustrates a flow diagram of an example method that propagates list modifications across a list manager shared group in accordance with one or more implementations.

Consider now FIG. 19 that illustrates an example method 1900 that propagates list information based on a list manager shared group in accordance with one or more implementations. The method can be performed by any suitable combination of hardware, software, and/or firmware. In at least some embodiments, aspects of the method can be implemented by one or more suitably configured hardware components and/or software modules, such as list manager module 104 of FIG. 1 and/or platform 212 of FIG. 2. While the method described in FIG. 19 illustrates these steps in a particular order, it is to be appreciated that any specific order or hierarchy of the steps described here is used to illustrate an example of a sample approach. Other approaches may be used that rearrange the ordering of these steps. Thus, the order steps described here may be rearranged, and the illustrated ordering of these steps is not intended to be limiting.

At 1902, various implementations establish a list manager shared group associated with a list manager. For example, a user can log into the list manager using any suitable type of credentials, such as a username, password, telephone number, etc., where the list manager provides collaborative services examples of which are provided herein. Accordingly, a list manager shared group can access some or all of the various collaborative services provided by the list manager. Upon accessing the list manager, various implementations create a list manager shared group by identifying other users to add to group as members. A member of the list manager shared group can be identified in any manner, such as through a user profile, a contact selection, an email addresses, a telephone number, and so forth. In turn, the list manager connects and/or maintains a link to the various members and/or devices included in the shared group. This can include maintaining links to various user profiles associated with the link manager. As one example, a server associated with providing list manager services can establish the list manager shared group by registering each selected member into a same group, such as through subscription techniques. As another example, the list manager can create and maintain a linked list that dynamically grows or shrinks as members are added or deleted to the group, where each linked list element includes information about a respective member (e.g., address information, identification information, etc.). However, other data grouping techniques can be used to create a link manager shared group without departing from the scope of the claimed subject matter. In some implementations, one or more link manager lists can be associated with the link manager shares group as further described herein.

At 1904, various implementations receive a modification to a list associated with the list manager share group. For example, new list items can be added to the list, old list items can be deleted, supplemental information associated with the list can be updated, a list item state and/or state change, an image can be uploaded to the list, a quantity value can change, a user comment can be added to a list item, a communication session associated with the list can be established or have a new communication, a list item can be assigned to a vendor, and so forth. Accordingly, in various implementations, the list includes list items/list manager list items that have supplemental information and/or can be manipulated via the various services provided by the list manager as further described herein.

In response to receiving the modification to the list, one or more implementations propagate the modification to the group members associated with the list manager shared group at 1906. The modification can be propagated in real-time such that when the modification is generated at a computing device of a first group member, the computing device propagates the modification over a communication network to the other group members in response to receiving the modification. For instance, the computing device can propagate the modification to a server that is associated with providing list manager services. In turn, the server can identify the group members and propagate the modifications to each respective group member, such as by traversing elements of a linked list for address information, broadcasting a message to all subscribers to the group, pushing the modifications to each group member, sending a message to each group member to pull the modification data, etc.

Figure 20:
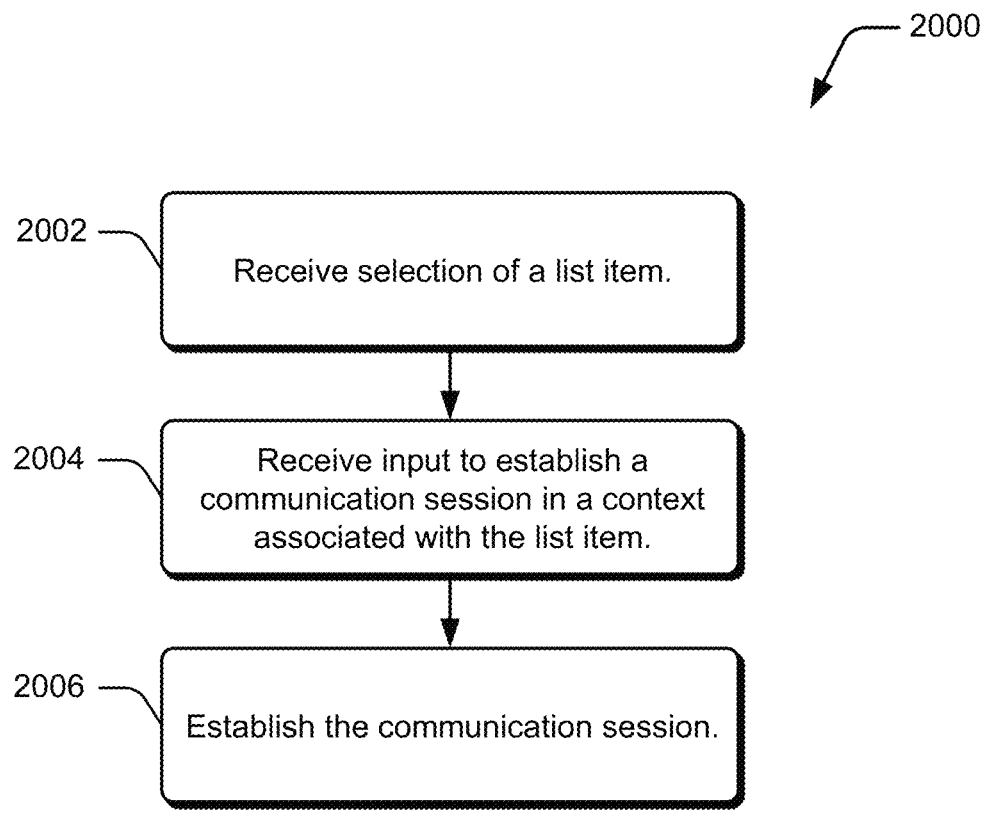
FIG. 20 illustrates a flow diagram of an example method that establishes a communication session in a context associated with a list item in accordance with one or more implementations.

Now consider FIG. 20 that illustrates an example method 2000 that establishes a communication session in accordance with one or more implementations. The method can be performed by any suitable combination of hardware, software, and/or firmware. In at least some embodiments, aspects of the method can be implemented by one or more suitably configured hardware components and/or software modules, such as list manager module 104 of FIG. 1 and/or platform 212 of FIG. 2. While the method described in FIG. 20 illustrates these steps in a particular order, it is to be appreciated that any specific order or hierarchy of the steps described here is used to illustrate an example of a sample approach. Other approaches may be used that rearrange the ordering of these steps. Thus, the order steps described here may be rearranged, and the illustrated ordering of these steps is not intended to be limiting.

At 2002, various implementations receive selection of a list item included in a list. In various implementations, the list is associated with a list manager that provides collaborative services, such as the acquisition of supplemental information, sharing list information across a list manager shared group, purchasing list items online, establishing communication sessions, and so forth. Accordingly, the list can include list items/list manager list items with supplemental information and/or can be manipulated via the various services provided by the list manager as further described herein.

At 2004, one or more implementations receive input to establish a communication session in a context associated with the selected list item. For example, the input can request to establish an instant messaging communication session between multiple instances of a list manager as further described herein. The input can alternately or additionally identify what participants to include in the communication session, such as through a contact selection, an address, and so forth. Here, the context associated with the list item provides information particular to the list item within the communication session such that the information is shared to each participant of the communication session. In various implementations, as the context associated with the list item changes, the context changes are propagated across the communication session.

In response to receiving input to establish the communication session, various implementations establish the communication session between each identified participant at 2006. This can include establishing a video session, an audio session, an instant messaging session, and so forth, where content is shared in real-time between the various participants. The communication session can include any suitable number of participants as further described herein. In establishing the communication session, various implementations share information associated with the list item, such as by displaying state information, images, coupon availability, etc., at a respective user interface of each participant in the communication session.

Figure 21:
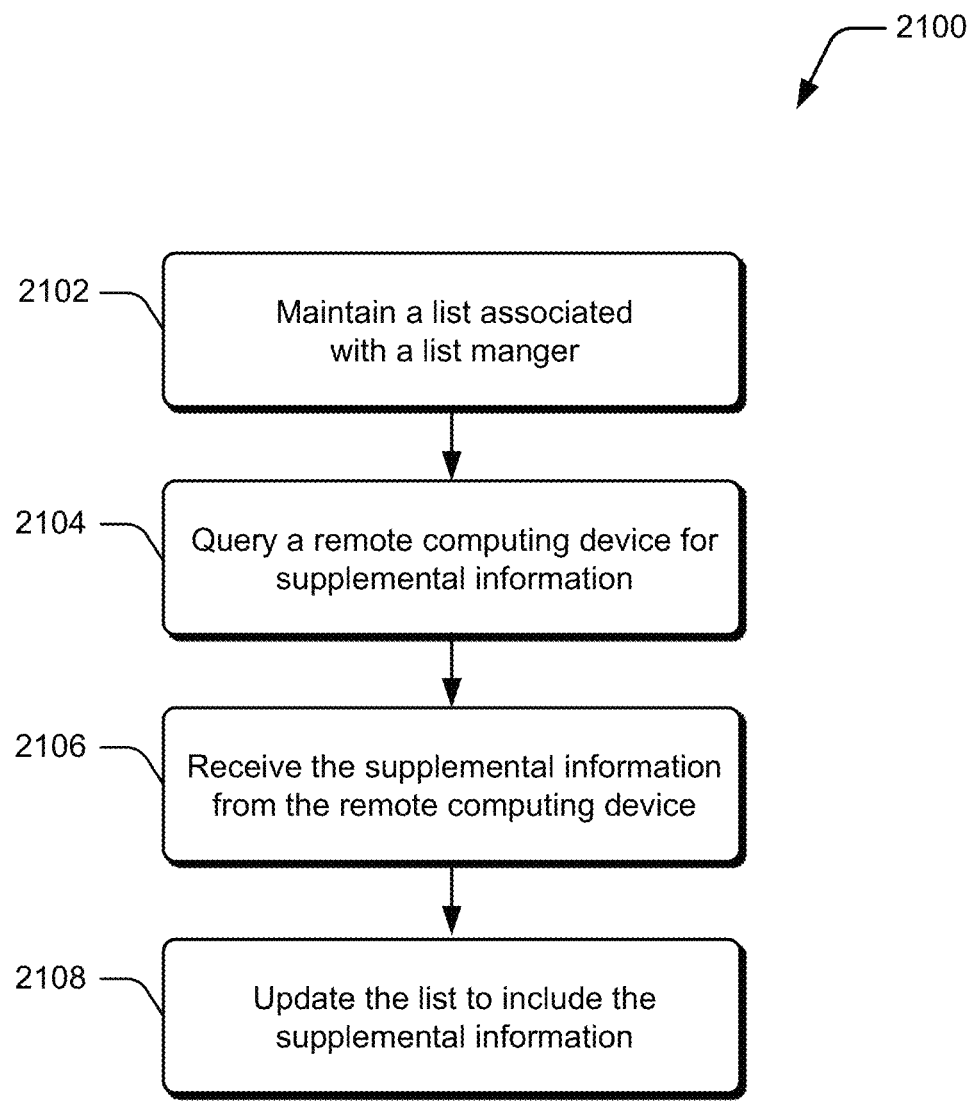
FIG. 21 illustrates a flow diagram of an example method that acquires supplemental information associated with a list item in accordance with one or more implementations.

Now consider FIG. 21 that illustrates an example method 2100 that acquires supplemental information in accordance with one or more implementations. The method can be performed by any suitable combination of hardware, software, and/or firmware. In at least some embodiments, aspects of the method can be implemented by one or more suitably configured hardware components and/or software modules, such as list manager module 104 of FIG. 1 and/or platform 212 of FIG. 2. While the method described in FIG. 21 illustrates these steps in a particular order, it is to be appreciated that any specific order or hierarchy of the steps described here is used to illustrate an example of a sample approach. Other approaches may be used that rearrange the ordering of these steps. Thus, the order steps described here may be rearranged, and the illustrated ordering of these steps is not intended to be limiting.

At 2102, various implementations maintain a list associated with a list manager that provides collaborative services, such as the acquisition of supplemental information, sharing list information across a list manager shared group, purchasing list items online, establishing communication sessions, and so forth. Accordingly, the lists being maintained can include list items/list manager list items with the supplemental information and/or can be manipulated via the various services provided by the list manager as further described herein.

At 2104, one or more implementations query a remote computing device for supplemental information associated with the list. This can include querying for supplemental information associated with a particular list item and/or multiple list items. Alternately or additionally, this can include sending a respective query to multiple remote computing devices. The query can request any suitable type of information, such as pricing information, coupon information, sale information, availability information, price change information, and so forth. Further, queries can be initiated in any suitable manner, such as through manual initiation where a user enters direct input to initiate the query (e.g., an input control dedicated to initiating a query). Alternately or additionally, the query can be initiated indirectly by the user. For example, the user can access a list for viewing purposes and, in response to the access, some implementations automatically initiate the query based on list items included in the list. Some implementations periodically query for supplemental information, where the query repeats periodically based on a default time duration and/or a user-defined time duration. In some instances, the query includes information associated with a list item, such as UPC code information. Accordingly, to generate the query, some implementations access a database to acquire stored supplemental information and include the stored supplemental information in the query.

At 2106, one or more implementations receive the supplemental information from the remote computing device and/or multiple computing devices. For instance, if multiple queries are sent to multiple remote computing devices, various implementations receive numerous instances of supplemental information. Accordingly, at 2108, various implementations update the list to include the supplemental information. This can include storing some or all of the newly received supplemental information in the database with some or all of the stored supplemental information, displaying a notification based on the supplemental information, sorting list items based on the supplemental information, etc. For example, the supplemental information can be used to sort vendors for a particular list item based upon pricing information. Accordingly, by acquiring supplemental information from remote computing devices, various implementations can improve user interactions with a list by automatically providing relevant information, such as by identifying pricing information, and putting lower-priced items in a more prominent visual location relative to the higher-priced items. In turn, this improves the user experience by helping the user obtain an end result more quickly and with less user interactions relative to implementations that do not provide, update, and/or sort the relevant information automatically.

Figure 22:
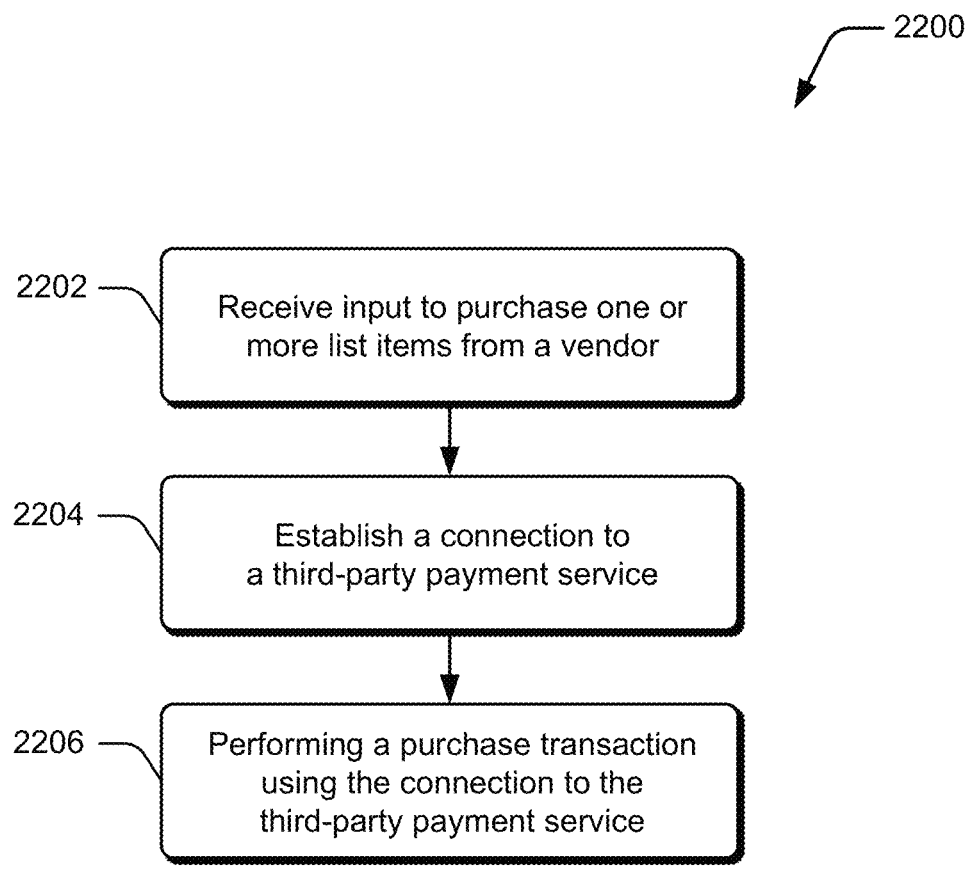
FIG. 22 illustrates a flow diagram of an example method that accesses a third-party service in accordance with one or more implementations.

Now consider FIG. 22 that illustrates an example method 2200 that provides access to third-party services in accordance with one or more implementations. The method can be performed by any suitable combination of hardware, software, and/or firmware. In at least some embodiments, aspects of the method can be implemented by one or more suitably configured hardware components and/or software modules, such as list manager module 104 of FIG. 1 and/or platform 212 of FIG. 2. While the method described in FIG. 22 illustrates these steps in a particular order, it is to be appreciated that any specific order or hierarchy of the steps described here is used to illustrate an example of a sample approach. Other approaches may be used that rearrange the ordering of these steps. Thus, the order steps described here may be rearranged, and the illustrated ordering of these steps is not intended to be limiting.

At 2202, one or more implementations receive input to purchase one or more list items from a vendor. In various implementations, the list items are included in a list associated with a list manager that provides collaborative services, such as the acquisition of supplemental information, sharing list information across a list manager shared group, purchasing list items online, establishing communication sessions, and so forth. Accordingly, the list items/list manager list items can include supplemental information and/or can be manipulated via the various services provided by the list manager as further described herein. As one example, the list manager associated with the list items can display a user interface that includes a control button associated with initiating a purchase transaction.

At 2204, and in response to receiving the input, various implementations establish a connection to a third-party payment service using the list manager. For example, the list manager can access the payment services, and provide a user interface within the list manager to expose various payment confirmation parameters. Alternately or additionally, establishing the connection can include establishing alternate or additional connection, such as connections to vendor services and/or delivery services. To illustrate, the connection to the third-party payment serve can interface with the vendor services to synchronize which list items from the list are being purchased from the vendor. As another example, the connection to the third-party payment service can interface with delivery services to configure delivery of the list items. While described here in the context of the list manager using the connection third-party payment service as a conduit to vendor services and/or delivery services, alternate or additional implementations enable the list manager to establish separate connections to third-party payment services, vendor services, and/or delivery services, where the list manager manages the interactions between the user and the various services.

In response to establishing the connection to the third-party payment service, one or more implementations perform a purchase transaction using the connection at 2206. For example, the list manager can forward user-preferences associated with the purchase transaction and/or confirmation to perform the purchase transaction to the third-party payment service, and update an associated user interface with confirmation that the purchase has completed. In turn, this improves user interactions with the list items by automatically exposing various purchase configuration parameters used to purchase the list items through the third-party payment service. This helps the user obtain an end result more quickly and with less user interactions relative to implementations that do not automate interfaces into a third-party payment service. In other words, without integrated third-party payment services within a list manager, the user would manually switch user interfaces to establish connections to third-party payment service and/or the vendor services, as well as manually managing the interactions between the various services.

Having described an example of collaborative services provided by a list manager, consider now a discussion of example devices in which can be used for various implementations.

Example Devices

Figure 23:
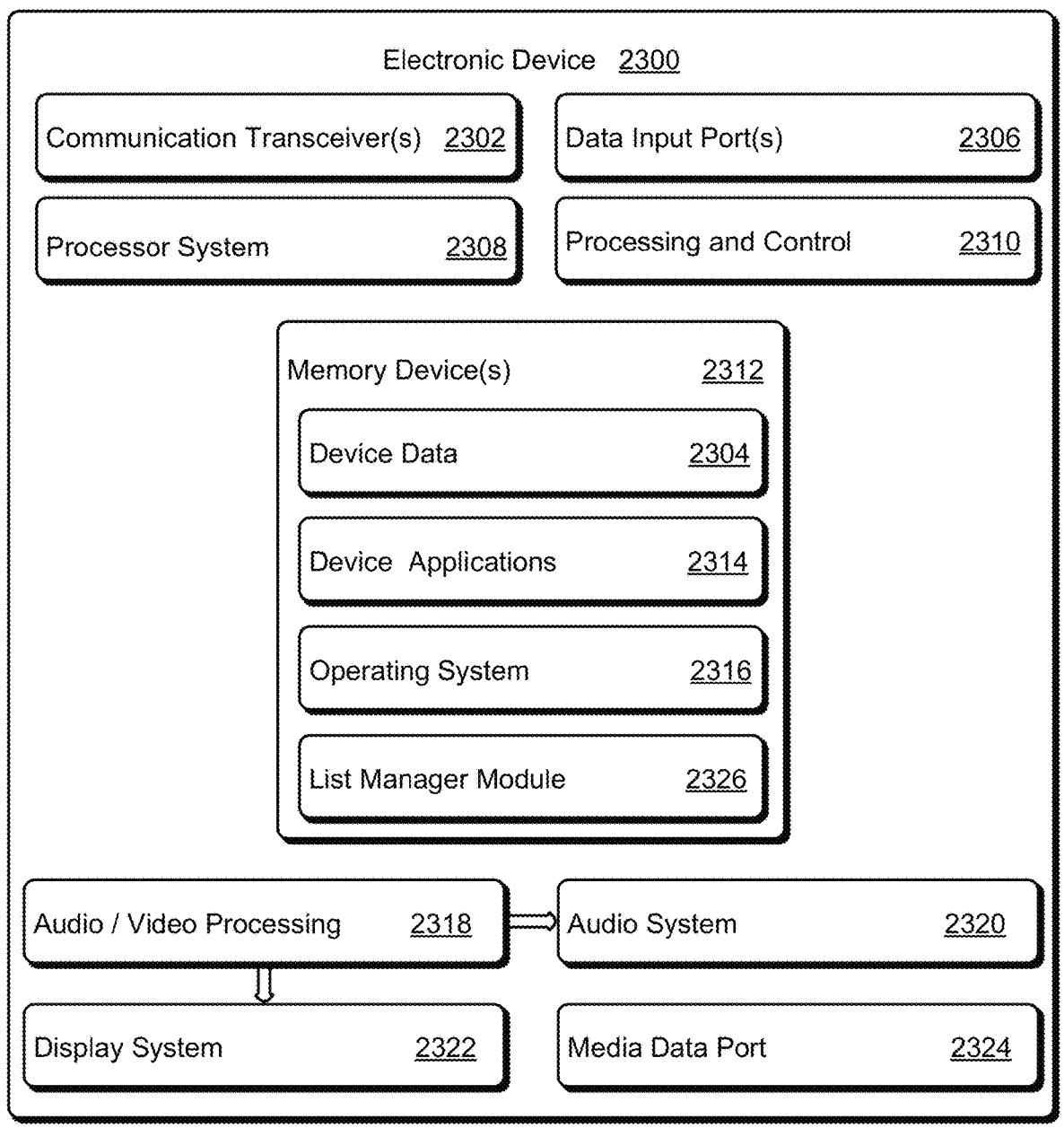
FIG. 23 is an illustration of an example computing device in accordance with one or more implementations.
Figure 24:
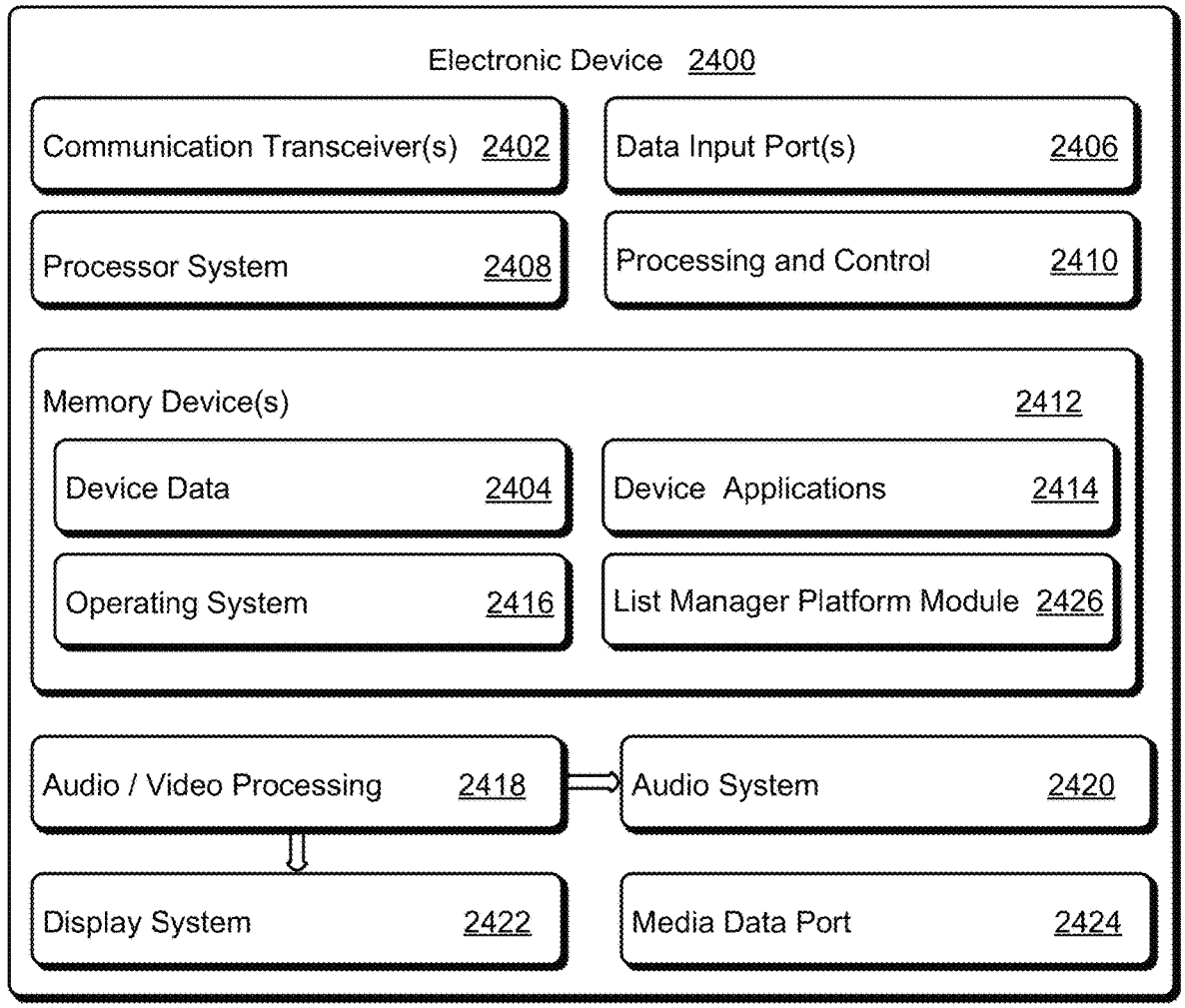
FIG. 24 is an illustration of an example server device in accordance with one or more implementations.

FIG. 23 illustrates various components of an example computing device 2300, such as computing device 102 of FIG. 1, while FIG. 24 illustrates various components of an example electronic device 2400, such as one of servers 122 of FIG. 1. Accordingly, electronic device 2300 and/or electronic device 2400 can be utilized to implement various aspects of collaborative list management as further described herein. In some implementations, electronic device 2300 and electronic device 2400 have at least some similar components. Accordingly, for the purposes of brevity, FIGS. 23 and 24 will be described together. Similar components associated with FIG. 23 will be identified as components having a naming convention of "23XX", and components associated with FIG. 24 will be identified as components having a naming convention of "24XX". Conversely, components distinct to each device will be described separately and after the similar components.

Electronic device 2300/electronic device 2400 includes communication transceivers 2302/communication transceivers 2402 that enable wired or wireless communication of device data 2304/device data 2404, such as received data and transmitted data. While referred to as a transceiver, it is to be appreciated that communication transceivers 2302/communication transceivers 2402 can additionally include separate transmit antennas and receive antennas without departing from the scope of the claimed subject matter. Example communication transceivers include Wireless Personal Area Network (WPAN) radios compliant with various Institute of Electrical and Electronics Engineers (IEEE) 802.15 (Bluetooth™) standards, Wireless Local Area Network (WLAN) radios compliant with any of the various IEEE 802.11 (WiFi™) standards, Wireless Wide Area Network (WWAN) radios for cellular telephony (3GPP-compliant), wireless metropolitan area network radios compliant with various IEEE 802.16 (WiMAX™) standards, and wired Local Area Network (LAN) Ethernet transceivers.

Electronic device 2300/electronic device 2400 may also include one or more data input ports 2306/data input ports 2406 via which any type of data, media content, and inputs can be received, such as user-selectable inputs, messages, music, television content, recorded video content, and any other type of audio, video, or image data received from any content or data source. Data input ports 2306/data input ports 2406 may include Universal Serial Bus (USB) ports, coaxial-cable ports, and other serial or parallel connectors (including internal connectors) for flash memory, Digital Versatile Discs (DVDs), Compact Disks (CDs), and the like. These data-input ports may be used to couple the electronic device to components, peripherals, or accessories such as keyboards, microphones, or cameras.

Electronic device 2300/electronic device 2400 of this example includes processor system 2308/processor system 2408 (e.g., any of application processors, microprocessors, digital-signal processors, controllers, and the like) or a processor and memory system (e.g., implemented in a system-on-chip), which processes computer-executable instructions to control operation of the device. A processing system may be implemented at least partially in hardware, which can include components of an integrated circuit or on-chip system, digital-signal processor, application-specific integrated circuit, field-programmable gate array, a complex programmable logic device, and other implementations in silicon and other hardware. Alternatively, or in addition, the electronic device can be implemented with any one or combination of software, hardware, firmware, or fixed-logic circuitry that is implemented in connection with processing and control circuits, which are generally identified as processing and control 2310/processing and control 2410. Although not shown, electronic device 2300/electronic device 2400 can include a system bus, crossbar, interlink, or data-transfer system that couples the various components within the device. A system bus can include any one or combination of different bus structures, such as a memory bus or memory controller, data protocol/format converter, a peripheral bus, a universal serial bus, a processor bus, or local bus that utilizes any of a variety of bus architectures.

Electronic device 2300/electronic device 2400 also includes one or more memory devices 2312/memory devices 2412 that enable data storage, examples of which include random access memory (RAM), non-volatile memory (e.g., read-only memory (ROM), flash memory, EPROM, EEPROM, etc.), and a disk storage device. Memory devices 2312/memory devices 2412 are implemented at least in part as a physical device that stores information (e.g., digital or analog values) in storage media, which does not include propagating signals or waveforms. The storage media may be implemented as any suitable types of media such as electronic, magnetic, optic, mechanical, quantum, atomic, and so on. Memory devices 2312/memory devices 2412 provide data storage mechanisms to store the device data 2304/device data 2404, other types of information or data, and/or various device applications 2314/device applications 2414 (e.g., software applications). For example, operating system 2316/operating system 2416 can be maintained as software instructions within memory devices 2312/memory devices 2412 and executed by processor system 2308/processor system 2408.

Electronic device 2300/electronic device 2400 optionally includes audio and video processing system 2318/audio and video processing system 2418 that processes audio data and passes through the audio and video data to optional audio system 2320/audio system 2420. Audio system 2320/audio system 2420 and optional display system 2322/display system 2422 may include any modules that process, display, or otherwise render audio, video, display, or image data. Display data and audio signals can be communicated to an audio component and to a display component via a radio-frequency link, S-video link, HDMI, composite-video link, component-video link, digital video interface, analog-audio connection, or other similar communication link, such as optional media data port 2324/media data port 2224. In some implementations, optional audio system 2320/audio system 2420 and optional display system 2322/display system 2422 are external components to electronic device 2300/electronic device 2400. Alternatively, or additionally, optional audio system 2320/audio system 2420 and optional display system 2322/display system 2422 can be an integrated component of the example electronic device 2300/electronic device 2400, such as part of an integrated speaker and/or an integrated display and touch interface.

In some aspects, memory devices 2312 of electronic device 2300 list manager module 2326 to provide collaborative list services associated with a list manager. This can include the generation of lists that include list items and/or list manager list items that are associated with supplemental information. In one or more implementations, the list manager module provides the ability to invoke various actions in the context of a list item and/or list, such as establishing a communication session, identifying vendors, gathering context information associated with list interactions, generate base lists based on the context information, gathering supplemental information from remote computing devices accessing third-party services, and so forth. While list manager module 2326 is illustrated here as residing on memory devices 2312, alternate or additional of the list manager module can in include software, firmware, hardware, or any combination thereof.

In some aspects, memory devices 2412 of electronic device 2400 includes list manager platform module 2426 to provide list manager services in a uniform manner to multiple different devices. For example, list manager module 2326 of electronic device 2300 can access and/or invoke various services implemented by list manager platform module 2426 over a communication network. These various services include collaborative services, examples of which are provided herein.

In view of the many possible aspects to which the principles of the present discussion may be applied, it should be recognized that the implementations described herein with respect to the drawing figures are meant to be illustrative only and should not be taken as limiting the scope of the claims. Therefore, the techniques as described herein contemplate all such implementations as may come within the scope of the following claims and equivalents thereof.

I claim:

1. A system comprising:
a processing system configured to execute instructions to cause the system to perform operations including:
receiving, via input to a graphical user interface displayed on a display device, selection of a list item included in a list associated with a list manager that provides one or more collaborative services;
populating a graphical user interface with a visual indication of the list item;
receiving input to invoke an action in a context associated with the list item, the action comprising one of the one or more collaborative services;
invoking the action in the context associated with the list item;
periodically querying one or more remote vendor data sources for updated information regarding the list item, the one or more remote vendor data sources representing one or more vendors that offer the list item;
obtaining, based on said periodically querying, updated information regarding the list item from the one or more remote vendor data sources;
modifying the visual indication of the list item in the graphical user interface to indicate the updated information regarding the list item;
initiating a communication session regarding the updated information regarding the list item, the communication session including:
an automated message describing the updated information regarding the list item; and
an exchange of communication media including one or more of text communication, audio communication, or video communication regarding the list item between the system and at least one other system.

2. The system as recited in claim 1, wherein the action comprises establishing, with a first instance of the list manager, the communication session with a second instance of the list manager in the context associated with the list item.

3. The system as recited in claim 1, wherein the action comprises assigning the list item to a vendor.

4. The system as recited in claim 3, wherein the action further comprises generating one or more vendor-based lists based, at least in part, on said assigning.

5. The system as recited in claim 1, wherein the action comprises invoking a purchase transaction with a vendor to purchase the list item, and wherein said invoking the purchase transaction further comprises accessing, via an instance of the list manager, a third-party payment service.

6. The system as recited in claim 1, wherein the action comprises accessing, via an instance of the list manager, a third-party delivery service.

7. The system as recited in claim 1, wherein the action comprises gathering, via an instance of the list manager, supplemental information associated with the list item.

8. A method implemented by at least one computing device, the method comprising:
   receiving, via the at least one computing device, selection of a list item included in a list associated with a list manager that provides one or more collaborative services;
   populating, via the at least one computing device, a graphical user interface with a visual indication of the list item;
   receiving input to invoke an action in a context associated with the list item, the action comprising one of the one or more collaborative services;
   invoking, via the at least one computing device, the action in the context associated with the list item;
   periodically querying, via the at least one computing device, one or more remote vendor data sources for updated information regarding the list item, the one or more remote vendor data sources representing one or more vendors that offer the list item;
   obtaining, based on said periodically querying, updated information regarding the list item from the one or more remote vendor data sources;
   modifying, via the at least one computing device, the visual indication of the list item in the graphical user interface to indicate the updated information regarding the list item;
   initiating, via the at least one computing device, a communication session regarding the updated information regarding the list item, the communication session including:
      an automated message describing the updated information regarding the list item; and
      an exchange of communication media including one or more of text communication, audio communication, or video communication regarding the list item between the at least one computing device and at least one other computing device.

9. The method as recited in claim 8, wherein the action comprises establishing, with a first instance of the list manager, the communication session with a second instance of the list manager in the context associated with the list item.

10. The method as recited in claim 8, wherein the action comprises assigning the list item to a vendor.

11. The method as recited in claim 10, wherein the action further comprises generating one or more vendor-based lists based, at least in part, on said assigning.

12. The method as recited in claim 8, wherein the action comprises invoking a purchase transaction with a vendor to purchase the list item, and wherein said invoking the purchase transaction further comprises accessing, via an instance of the list manager, a third-party payment service.

13. The method as recited in claim 8, wherein the action comprises gathering, via an instance of the list manager, supplemental information associated with the list item.

14. The method as recited in claim 8, wherein the updated information comprises one or more of updated pricing information, coupon information, sale information, or availability information.

15. The method as recited in claim 8, wherein the graphical user interface comprises visual indications of multiple list items including the list item, the method further comprising sorting the multiple list items in the graphical user interface based on the updated information regarding the list item.

16. One or more non-transitory computer-readable storage media storing instructions that are executable by a computing system to perform operations comprising:
   receiving selection of a list item included in a list associated with a list manager that provides one or more collaborative services;
   populating a graphical user interface with a visual indication of the list item;
   receiving input to invoke an action in a context associated with the list item, the action comprising one of the one or more collaborative services;
   invoking the action in the context associated with the list item;
   periodically querying one or more remote vendor data sources for updated information regarding the list item, the one or more remote vendor data sources representing one or more vendors that offer the list item;
   obtaining, based on said periodically querying, updated information regarding the list item from the one or more remote vendor data sources;
   modifying the visual indication of the list item in the graphical user interface to indicate the updated information regarding the list item;
   initiating a communication session regarding the updated information regarding the list item, the communication session including:
      an automated message describing the updated information regarding the list item; and
      an exchange of communication media including one or more of text communication, audio communication, or video communication regarding the list item.

17. One or more non-transitory computer-readable storage media as recited in claim 16, wherein the action comprises assigning the list item to a vendor.

18. One or more non-transitory computer-readable storage media as recited in claim 17, wherein the action further comprises generating one or more vendor-based lists based, at least in part, on said assigning.

19. One or more non-transitory computer-readable storage media as recited in claim 16, wherein the action comprises invoking a purchase transaction with a vendor to purchase the list item, and wherein said invoking the purchase transaction further comprises accessing, via an instance of the list manager, a third-party payment service.

20. One or more non-transitory computer-readable storage media as recited in claim 16, wherein the action comprises accessing, via an instance of the list manager, a third-party delivery service.

\* \* \* \* \*